United States Patent
Amano et al.

(10) Patent No.: US 11,067,776 B2
(45) Date of Patent: Jul. 20, 2021

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventors: Masaru Amano, Saitama (JP); Yukiko Nagatoshi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 297 days.

(21) Appl. No.: 16/196,779

(22) Filed: Nov. 20, 2018

(65) Prior Publication Data
US 2019/0154992 A1    May 23, 2019

(30) Foreign Application Priority Data
Nov. 20, 2017 (JP) .............................. JP2017-222774

(51) Int. Cl.
| | |
|---|---|
| G02B 13/00 | (2006.01) |
| H04N 9/31 | (2006.01) |
| G02B 13/16 | (2006.01) |
| G02B 13/04 | (2006.01) |
| G02B 27/14 | (2006.01) |
| H04N 5/225 | (2006.01) |

(52) U.S. Cl.
CPC ..... *G02B 13/0045* (2013.01); *G02B 13/0065* (2013.01); *G02B 13/04* (2013.01); *G02B 13/16* (2013.01); *H04N 9/317* (2013.01); *G02B 27/149* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 7,079,314 B1 | 7/2006 | Suenaga et al. | |
| 2011/0026138 A1* | 2/2011 | Asami | G02B 9/34 359/715 |

(Continued)

FOREIGN PATENT DOCUMENTS

| | | |
|---|---|---|
| CN | 106772949 A | 5/2017 |
| JP | 2001-27727 A | 1/2001 |

(Continued)

OTHER PUBLICATIONS

An Office Action; "Notice of Reasons for Refusal", mailed by the Japanese Patent Office dated Oct. 27, 2020, which corresponds to Japanese Patent Application No. 2018-217750 and is related to U.S. Appl. No. 16/196,779; with English language translation.

*Primary Examiner* — Michelle M Iacoletti
*Assistant Examiner* — Danell L Owens
(74) *Attorney, Agent, or Firm* — Studebaker & Brackett PC

(57) ABSTRACT

The imaging optical system consists of, in order from a magnification side: a first imaging optical system that forms an intermediate image on a position conjugate to a magnification side imaging surface; and a second imaging optical system that re-forms the intermediate image on a reduction side imaging surface. The first imaging optical system consists of, in order from the magnification side, a first A lens group, a first optical path deflection unit that deflects an optical path, a first B lens group, and a second optical path deflection unit that deflects the optical path. In addition, the intermediate image is formed between the second optical path deflection unit and the second imaging optical system.

20 Claims, 18 Drawing Sheets

(56) References Cited

U.S. PATENT DOCUMENTS

2011/0109971 A1\* 5/2011 Beach ................. G02B 17/008
 359/618
2015/0234157 A1 8/2015 Ichimura
2016/0246037 A1\* 8/2016 Amano ................. G02B 13/06

FOREIGN PATENT DOCUMENTS

JP 2015-152764 A 8/2015
JP 2016-156986 A 9/2016

\* cited by examiner

EXAMPLE 1

EXAMPLE 2

EXAMPLE 6

IMAGING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2017-222774 filed on Nov. 20, 2017. The above application is hereby expressly incorporated by reference, in its entirety, into the present application.

BACKGROUND OF THE INVENTION

1. Field of the Invention

The present invention relates to an imaging optical system forming an intermediate image, a projection display device comprising the imaging optical system, and an imaging apparatus comprising the imaging optical system.

2. Description of the Related Art

In the past, projection display devices, each of which uses a light valve such as a liquid crystal display element or a Digital Micromirror Device (DMD: registered trademark) display element, have come into widespread use.

Favorable optical aberration correction appropriate for the resolution of the light valve has been required for the imaging optical system used in this type of the projection display devices. In addition, there has been an increase in the demand to mount a highly versatile imaging optical system on a projection display device. The imaging optical system has a higher performance and a wider-angle while having a small size in consideration of an increase in degree of freedom in setting the distance to the screen and installability in the indoor space.

An imaging optical system, which forms an intermediate image at a position conjugate to the reduction side imaging surface and re-forms the intermediate image on the magnification side imaging surface, has been proposed so as to cope with such demands (For example, JP2015-152764A and JP2016-156986A)

SUMMARY OF THE INVENTION

However, in the lens of JP2015-152764A, the total length of the lens is increased, and thus the lens system and the entire apparatus are not downsized. The lens in JP2016-156986A achieves reduction in size by providing the optical path deflection unit in the optical system. However, in this configuration, there is a problem that the lens inevitably becomes large in the height direction.

The present invention has been made in consideration of the above-mentioned situations, and it is an object of the present invention to provide an imaging optical system forming an intermediate image, a projection display device comprising the imaging optical system, and an imaging apparatus comprising the imaging optical system. The imaging optical system has a high optical performance by achieving reduction in size while suppressing an increase in size in the height direction and by satisfactorily correcting various aberrations at a wide angle.

An imaging optical system of the present invention consists of, in order from a magnification side: a first imaging optical system that forms an intermediate image on a position conjugate to a magnification side imaging surface; and a second imaging optical system that re-forms the intermediate image on a reduction side imaging surface. The first imaging optical system consists of, in order from the magnification side, a first A lens group, a first optical path deflection unit that deflects an optical path, a first B lens group, and a second optical path deflection unit that deflects the optical path. In addition, the intermediate image is formed between the second optical path deflection unit and the second imaging optical system.

In the imaging optical system of the present invention, assuming that a back focal length of the first imaging optical system is Bf1 and a focal length of the whole system is f, it is preferable to satisfy Conditional Expression (1), and it is more preferable to satisfy Conditional Expression (1-1).

$$5 < Bf1/|f| < 15 \quad (1)$$

$$7 < Bf1/|f| < 12 \quad (1\text{-}1)$$

Further, assuming that a focal length of the whole system is f and a focal length of the second imaging optical system is f2, it is preferable to satisfy Conditional Expression (2), and it is more preferable to satisfy Conditional Expression (2-1).

$$-0.1 < |f|/f2 \le 0 \quad (2)$$

$$-0.06 < |f|/f2 < 0 \quad (2\text{-}1)$$

Further, assuming that a focal length of the first imaging optical system is f1 and a focal length of the whole system is f, it is preferable to satisfy Conditional Expression (3), and it is more preferable to satisfy Conditional Expression (3-1).

$$1.5 < f1/|f| < 2.5 \quad (3)$$

$$1.8 < f1/|f| < 2.3 \quad (3\text{-}1)$$

Further, assuming that a sum of center thicknesses of respective lenses composing the first B lens group is $\Sigma t1B$ and a distance on the optical axis from a surface closest to the magnification side to a surface closest to a reduction side in the first B lens group is TL1B, it is preferable to satisfy Conditional Expression (4), and it is more preferable to satisfy Conditional Expression (4-1).

$$0.8 < \Sigma t1B/TL1B < 1 \quad (4)$$

$$0.9 < \Sigma t1B/TL1B < 1 \quad (4\text{-}1)$$

Further, assuming that a focal length of a lens closest to the magnification side in the second imaging optical system is fL2a and a focal length of the whole system is f, it is preferable to satisfy Conditional Expression (5), and it is more preferable to satisfy Conditional Expression (5-1).

$$10 < fL2a/|f| < 50 \quad (5)$$

$$15 < fL2a/|f| < 35 \quad (5\text{-}1)$$

Further, assuming that a focal length of a lens closest to the reduction side in the first B lens group is fLBL and a focal length of the whole system is f, it is preferable to satisfy Conditional Expression (6), and it is more preferable to satisfy Conditional Expression (6-1).

$$10 < fLBL/|f| < 60 \quad (6)$$

$$20 < fLBL/|f| < 45 \quad (6\text{-}1)$$

Further, assuming that a distance on the optical axis from a surface closest to the reduction side in the second imaging optical system to the second optical path deflection unit is La, a distance on the optical axis from the second optical path deflection unit to the first optical path deflection unit is Lb, and a distance on the optical axis from the first optical path deflection unit to a surface closest to the magnification side in the first A lens group is Lc, it is preferable to satisfy Conditional Expressions (7) and (8), and it is more preferable to satisfy Conditional Expression (7-1) and/or (8-1) while satisfying Conditional Expressions (7) and (8).

$$1 < La/Lc < 3 \tag{7}$$

$$1.4 < La/Lc < 2.5 \tag{7-1}$$

$$0.2 < Lb/Lc < 2 \tag{8}$$

$$0.4 < Lb/Lc < 1.15 \tag{8-1}$$

A projection display device, comprising: a light valve from which an optical image is output based on image data; and the imaging optical system according to claim 1, wherein the imaging optical system projects the optical image, which is output from the light valve, onto a screen.

An imaging apparatus of the present invention comprises the above-mentioned imaging optical system of the present invention.

It should be noted that the term "consists of ~" means that the imaging lens may include not only the above-mentioned elements but also lenses substantially having no powers, optical elements, which are not lenses, such as a stop, a mask, a cover glass, a filter, a mirror, and a prism, and mechanism parts such as a lens flange, a lens barrel, an imaging element, and a camera shaking correction mechanism.

Further, among the symbols of the respective conditional expressions, the focal length means a focal length in a case where the distance from the magnification side imaging surface to the first imaging optical system is infinite.

The imaging optical system of the present invention consists of, in order from the magnification side: a first imaging optical system that forms an intermediate image on a position conjugate to a magnification side imaging surface; and a second imaging optical system that re-forms the intermediate image on a reduction side imaging surface. The first imaging optical system consists of, in order from the magnification side, a first A lens group, a first optical path deflection unit that deflects an optical path, a first B lens group, and a second optical path deflection unit that deflects the optical path. In addition, the intermediate image is formed between the second optical path deflection unit and the second imaging optical system. Therefore, it is possible to provide an imaging optical system having a high optical performance by achieving reduction in size while suppressing an increase in size in the height direction and by satisfactorily correcting various aberrations at a wide angle, a projection display device comprising the imaging optical system, and an imaging apparatus comprising the imaging optical system.

DESCRIPTION OF THE PREFERRED EMBODIMENTS

Figure 1:
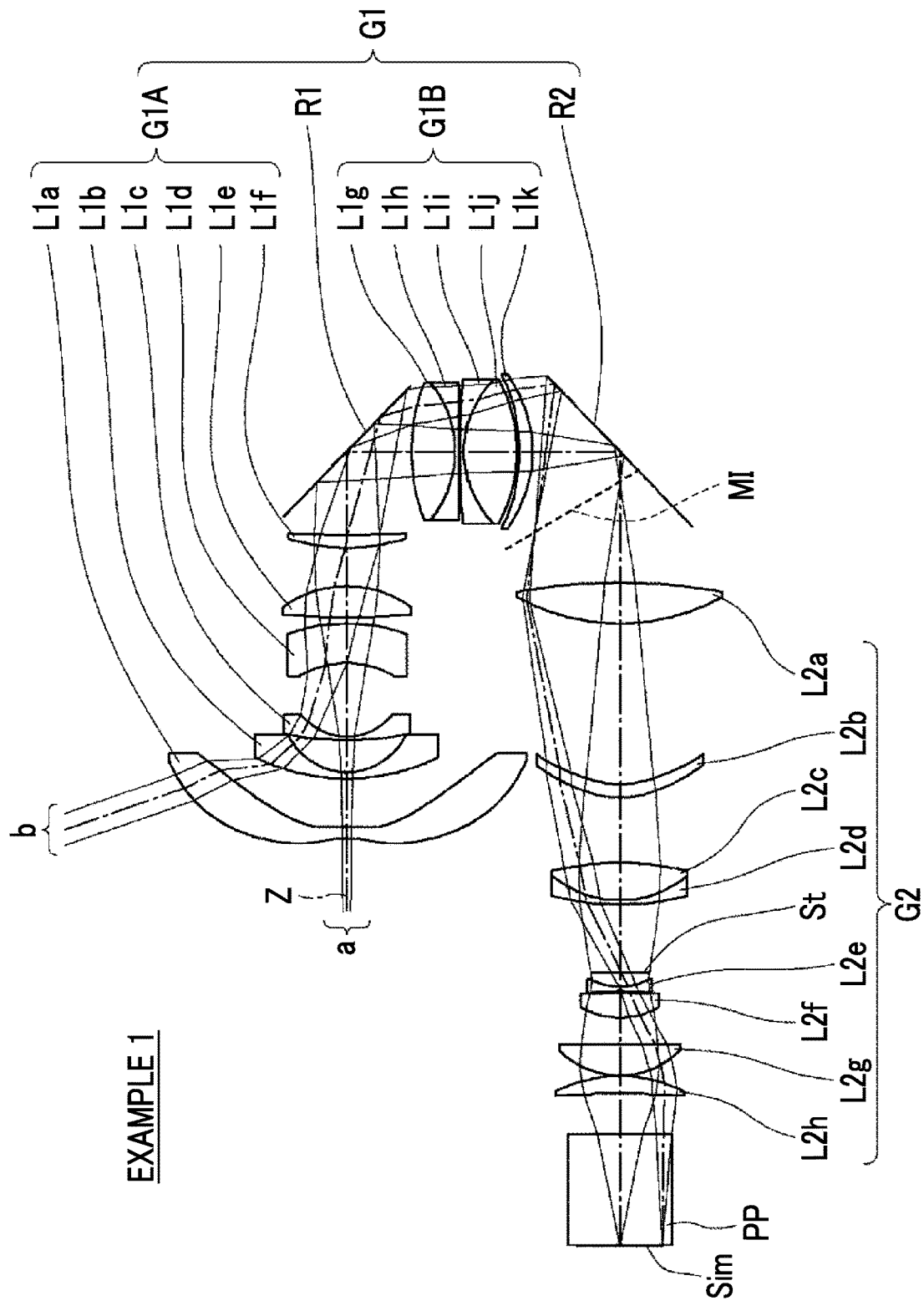
FIG. 1 is a cross-sectional view illustrating a lens configuration of an imaging optical system (common to Example 1) according to an embodiment of the present invention.

Hereinafter, an embodiment of the present invention will be described in detail with reference to the drawing. FIG. 1 is a cross-sectional view illustrating a lens configuration of an imaging optical system according to an embodiment of the present invention. The exemplary configuration shown in FIG. 1 is the same as the configuration of the imaging optical system of Example 1 to be described later. In FIG. 1, the left side is the magnification side, and the right side is the reduction side. Further, FIG. 1 shows a state where a distance from the magnification side imaging surface to the first imaging optical system is infinite, where on-axis rays a and rays with the maximum angle of view b are denoted.

This imaging optical system is, for example, mounted on a projection display device, and can be used to project image information displayed on the light valve onto the screen. In FIG. 1, assuming that the imaging optical system is mounted on the projection display device, an optical member PP such as a filter or a prism used in a color synthesizing section or an illumination light separating section, and an image display surface Sim of a light valve positioned on a reduction side surface of the optical member PP are also shown. In the projection display device, rays, which are made to have image information through the image display surface Sim on the image display element, are incident into the imaging optical system through the optical member PP, and are projected onto a screen, which is not shown in the drawing, through the imaging optical system.

As shown in FIG. 1, the imaging optical system of the present embodiment is composed of, in order from the magnification side, a first imaging optical system G1 that forms an intermediate image MI at a position conjugate to a magnification side imaging surface, and a second imaging optical system G2 that re-forms the intermediate image MI on a reduction side imaging surface (image display surface Sim). In FIG. 1, the intermediate image MI is schematically shown, and does not show an actual shape.

As described above, in the imaging optical system forming the intermediate image MI, the diameter of the magnification side lens of the first imaging optical system G1 can be reduced, and the focal length of the whole system can be shortened. As a result, it is possible to realize a configuration suitable for the wide angle.

The first imaging optical system G1 is configured to consist of, in order from the magnification side: a first A lens group G1A; a first optical path deflection unit R1 that deflects an optical path of rays, which are incident from the first A lens group G1A, toward a first B lens group G1B; the first B lens group G1B; and a second optical path deflection unit R2 that deflects the optical path of the rays, which are incident from the first B lens group G1B, toward the second imaging optical system G2. In addition, the intermediate image MI is formed between the second optical path deflection unit R2 and the second imaging optical system G2.

In a case where it is attempted to suppress the size in the height direction (the vertical direction in FIG. 1) in such a configuration in which the intermediate image MI is formed between the first B lens group G1B and the second optical path deflection unit R2, it is inevitable that the lens or the second optical path deflection unit R2 is disposed in the vicinity of the intermediate image MI or at the imaging point of the intermediate image MI. Accordingly, it is difficult to ignore the influence of reflection of dust, scratches, and/or the like, which are on the surface of the lens or the second optical path deflection unit R2, on the screen surface. Thus, in some cases, the optical performance will be greatly affected.

On the other hand, in the imaging optical system of the present embodiment, the intermediate image MI is formed between the second optical path deflection unit R2 and the second imaging optical system G2. Thus, with such a configuration, it is possible to set arrangement for eliminating the influence on the optical performance due to reflection of dust, scratches, and/or the like on the screen surface while minimizing the size of the system in the height direction (vertical direction in FIG. 1).

In the imaging optical system of the present embodiment, assuming that a back focal length of the first imaging optical system G1 is Bf1 and a focal length of the whole system is f, it is preferable to satisfy Conditional Expression (1). By not allowing the result of Conditional Expression (1) to be equal to or less than the lower limit, the back focal length of the first imaging optical system G1 can be prevented from becoming excessively short, and the intermediate image MI is easily disposed between the second optical path deflection unit R2 and the second imaging optical system G2. Thus, this configuration is advantageous in reduction in size and optical performance. By not allowing the result of Conditional Expression (1) to be equal to or greater than the upper limit, the back focal length of the first imaging optical system G1 can be prevented from becoming excessively long. Thus, it is possible to minimize the diameter of the magnification side lens of the second imaging optical system G2, and it is possible to minimize the diameter of the magnification side lens of the first imaging optical system G1. As a result, there is an advantage in achieving reduction in size. Further, there is also an advantage in correcting off-axis aberrations. In addition, in a case where Conditional Expression (1-1) is satisfied, it is possible to obtain more favorable characteristics.

$$5<Bf1/|f|<15 \quad (1)$$

$$7<Bf1/|f|<12 \quad (1\text{-}1)$$

Further, assuming that a focal length of the whole system is f and a focal length of the second imaging optical system G2 is f2, it is preferable to satisfy Conditional Expression (2). By not allowing the result of Conditional Expression (2) to be equal to or less than the lower limit, the negative refractive power of the second imaging optical system G2 can be prevented from becoming excessively strong, and the angle of the off-axis principal ray incident into the second imaging optical system G2 with respect to the optical axis Z can be prevented from becoming excessively large. Thus, there are advantages in ensuring the space for arranging the second optical path deflection unit R2 and in reducing the diameter of the magnification side lens of the second imaging optical system G2. In addition, there is also an advantage in correcting field curvature. By not allowing the result of Conditional Expression (2) to be equal to or greater than the upper limit, the negative refractive power of the second imaging optical system G2 can be prevented from becoming excessively weak. Thus, the back focal length of the first imaging optical system G1 can be prevented from becoming excessively short. In addition, in a case where Conditional Expression (2-1) is satisfied, it is possible to obtain more favorable characteristics.

$$-0.1<|f|/f2 \leq 0 \quad (2)$$

$$-0.06<|f|/f2<0 \quad (2\text{-}1)$$

Further, by making the refractive power of the second imaging optical system G2 negative, it is possible to correct the field curvature which becomes a problem in wide angle while ensuring the back focal length of the first imaging optical system G1.

Further, assuming that a focal length of the first imaging optical system G1 is f1 and a focal length of the whole system is f, it is preferable to satisfy Conditional Expression (3). By not allowing the result of Conditional Expression (3) to be equal to or less than the lower limit, it is possible to minimize the brightness (F number) required for the first imaging optical system G1. Therefore, there are advantages in achieving the wide angle and in correcting spherical aberration and astigmatism. By not allowing the result of Conditional Expression (3) to be equal to or greater than the upper limit, the relay magnification can be prevented from becoming excessively large. Thus, the lens diameter of the first imaging optical system G1 can be prevented from becoming larger. As a result, there is an advantage in correcting distortion and field curvature in the first imaging optical system G1. In addition, in a case where Conditional Expression (3-1) is satisfied, it is possible to obtain more favorable characteristics.

$$1.5<f1/|f|<2.5 \quad (3)$$

$$1.8<f1/|f|<2.3 \quad (3\text{-}1)$$

Further, assuming that a sum of center thicknesses of respective lenses composing the first B lens group G1B is $\Sigma t1B$, and a distance on the optical axis from a surface closest to the magnification side to a surface closest to a reduction side in the first B lens group G1B is TL1B, it is preferable to satisfy Conditional Expression (4). By not allowing the result of Conditional Expression (4) to be equal to or less than the lower limit, the ratio of the air interval in the first B lens group G1B can be prevented from being excessively increased. Therefore, the height of the entire imaging optical system can be prevented from being increased. In addition, it is possible to keep the balance between the back focal length of the first imaging optical system G1 and the diameter of the magnification side lens of the first imaging optical system G1. As a result, there is an advantage in achieving both wide angle and reduction in size. In addition, in a case where Conditional Expression (4-1) is satisfied, it is possible to obtain more favorable characteristics.

$$0.8 < \Sigma t1B/TL1B < 1 \quad (4)$$

$$0.9 < \Sigma t1B/TL1B < 1 \quad (4\text{-}1)$$

Further, assuming that a focal length of a lens L2a closest to the magnification side in the second imaging optical system G2 is fL2a and a focal length of the whole system is f, it is preferable to satisfy Conditional Expression (5). By not allowing the result of Conditional Expression (5) to be equal to or less than the lower limit, the positive refractive power of the second imaging optical system G2 can be prevented from becoming excessively strong. Thus, the rays around the lens can be prevented from changing suddenly. As a result, it is possible to reduce the astigmatism. By not allowing the result of Conditional Expression (5) to be equal to or greater than the upper limit, the positive refractive power of the second imaging optical system G2 can be prevented from becoming excessively weak. Thus, it is possible to reduce the diameter of the lens closer to the reduction side than the lens L2a. As a result, there is an advantage in achieving reduction in size. In addition, in a case where Conditional Expression (5-1) is satisfied, it is possible to obtain more favorable characteristics.

$$10 < fL2a/|f| < 50 \quad (5)$$

$$15 < fL2a/|f| < 35 \quad (5\text{-}1)$$

Further, assuming that a focal length of a lens closest to the reduction side in the first B lens group G1B is fLBL and a focal length of the whole system is f, it is preferable to satisfy Conditional Expression (6). By not allowing the result of Conditional Expression (6) to be equal to or less than the lower limit, the refractive power of the lens closest to the reduction side of the first B lens group G1B can be prevented from becoming excessively strong. Thus, there is an advantage in ensuring the back focal length of the first imaging optical system G1 and correcting spherical aberration. By not allowing the result of Conditional Expression (6) to be equal to or greater than the upper limit, the refractive power of the lens closest to the reduction side in the first B lens group G1B can be prevented from becoming excessively weak. Thus, there is an advantage in correcting off-axis aberration, particularly, field curvature. In addition, in a case where Conditional Expression (6-1) is satisfied, it is possible to obtain more favorable characteristics.

$$10 < fLBL/|f| < 60 \quad (6)$$

$$20 < fLBL/|f| < 45 \quad (6\text{-}1)$$

Further, assuming that a distance on the optical axis from a surface closest to the reduction side in the second imaging optical system G2 to the second optical path deflection unit R2 is La, a distance on the optical axis from the second optical path deflection unit R2 to the first optical path deflection unit R1 is Lb, and a distance on the optical axis from the first optical path deflection unit R1 to a surface closest to the magnification side in the first A lens group G1A is Lc, it is preferable to satisfy Conditional Expressions (7) and (8). By not allowing the result of Conditional Expressions (7) and (8) to be equal to or less than the lower limit, the space inside the imaging optical system, which is bent by the two optical path deflection units R1 and R2, can be prevented from becoming excessively small. Thus, it is possible to ensure a sufficient space for arranging the optical elements constituting the imaging optical system. By not allowing the result of Conditional Expressions (7) and (8) to be equal to or greater than the upper limit, the space inside the imaging optical system, which is bent by the two optical path deflection units R1 and R2, can be prevented from becoming excessively large. Thus, there is an advantage in achieving reduction in size. In a case where Conditional Expressions (7) and (8) are satisfied while Conditional Expression (7-1) and/or (8-1) is satisfied, it is possible to obtain more favorable characteristics.

$$1 < La/Lc < 3 \quad (7)$$

$$1.4 < La/Lc < 2.5 \quad (7\text{-}1)$$

$$0.2 < Lb/Lc < 2 \quad (8)$$

$$0.4 < Lb/Lc < 1.15 \quad (8\text{-}1)$$

In the example shown in FIG. 1, the optical member PP is disposed between the lens system and the image display surface Sim. However, various filters such as a lowpass filter and a filter for cutting off a specific wavelength range may not be disposed between the lens system and the image display surface Sim. Instead, such various filters may be disposed between the lenses, or coating for functions the same as those of various filters may be performed on a lens surface of any lens.

Next, numerical examples of the imaging optical system of the present invention will be described. First, an imaging optical system of Example 1 will be described. FIG. 1 is a cross-sectional view illustrating a lens configuration of the imaging optical system of Example 1. In FIG. 1 and FIGS. 2 to 7 corresponding to Examples 2 to 7 to be described later, the left side is the magnification side, and the right side is the reduction side. Further, FIGS. 1 to 7 each show a state where a distance from the magnification side imaging surface to the first imaging optical system is infinite, where on-axis rays a and rays with the maximum angle of view b are denoted.

The imaging optical system of Example 1 is composed of, in order from the magnification side, a first imaging optical system G1 and a second imaging optical system G2. The first imaging optical system G1 is composed of, in order from the magnification side: a first A lens group G1A composed of six lenses L1a to L1f; a first optical path deflection unit R1 that deflects an optical path of rays, which are incident from the first A lens group G1A, toward the first B lens group G1B; a first B lens group G1B composed of five lenses L1g to L1k; and a second optical path deflection unit R2 that deflects an optical path of rays, which are incident from the first B lens group G1B, toward the second imaging optical system G2. The second imaging optical system G2 is composed of eight lenses L2a to L2h and an aperture stop St. In addition, an intermediate image MI is formed between the second optical path deflection unit R2 and the second imaging optical system G2.

Table 1 shows basic lens data of the imaging optical system of Example 1, Table 2 shows data about specification, and Table 3 shows data about aspheric surface coefficients. Hereinafter, meanings of the reference signs in the tables are, for example, as described in Example 1, and are basically the same as those in Examples 2 to 7.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)). Furthermore, the sign of the radius of curvature is positive in a case where a surface has a shape convex toward the magnification side, and is negative in a case where a surface has a shape convex toward the reduction side. The basic lens data additionally shows the optical member PP.

In the data about the specification of Table 2, values of the focal length |f|, the back focal length Bf, the F number FNo., and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 3 shows the surface numbers of the aspheric surfaces and aspheric surface coefficients of the aspheric surfaces. The "E±n" (n: an integer) in numerical values of the aspheric surface coefficients of Table 3 indicates "×10$^{±n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis),
C is an inverse of paraxial radius of curvature,
KA and Am are aspheric surface coefficients, and
Σ at the aspheric surface depth Zd means the sum with respect to m.

In the basic lens data and data about specification, a degree is used as a unit of angle, and a numerical value normalized with the focal length |f|=1 is described for length.

TABLE 1

Example 1 Lens Data (n, ν are based on the d line)

| Surface Number | Radius of Curvature | Surface Distance | n | ν |
|---|---|---|---|---|
| *1 | −3.7691 | 0.7946 | 1.53158 | 55.08 |
| *2 | −7.5547 | 3.3334 | | |
| 3 | 15.3024 | 0.4315 | 1.83400 | 37.16 |
| 4 | 4.6701 | 2.1840 | | |
| 5 | 21.5103 | 0.2648 | 1.83481 | 42.72 |
| 6 | 4.2779 | 5.0253 | | |
| 7 | −6.6496 | 2.6440 | 1.63854 | 55.38 |
| 8 | −12.2810 | 0.4627 | | |
| 9 | 87.2903 | 2.0804 | 1.48749 | 70.44 |
| 10 | −7.9454 | 2.6908 | | |
| 11 | 14.5135 | 0.8405 | 1.80518 | 25.46 |
| 12 | 62.2019 | 10.2968 | | |
| 13 | 12.2598 | 3.0899 | 1.58913 | 61.13 |
| 14 | −7.2516 | 0.2576 | 1.80518 | 25.46 |
| 15 | ∞ | 0.0869 | | |
| 16 | 54.2158 | 0.2770 | 1.84667 | 23.79 |
| 17 | 6.9807 | 3.7041 | 1.49700 | 81.61 |
| 18 | −10.0386 | 0.1315 | | |
| *19 | −12.7673 | 1.0037 | 1.51007 | 56.24 |
| *20 | −6.5454 | 15.1376 | | |
| 21 | 41.3155 | 2.7869 | 1.51680 | 64.20 |
| 22 | −15.5678 | 10.9335 | | |
| *23 | −6.6416 | 0.9627 | 1.51007 | 56.24 |
| *24 | −6.2192 | 4.4619 | | |
| 25 | 20.9134 | 2.5610 | 1.80610 | 40.95 |
| 26 | −7.7034 | 0.2720 | 1.80518 | 25.46 |
| 27 | −20.2406 | 4.6720 | | |
| 28 (Stop) | ∞ | 0.9473 | | |
| 29 | −4.7211 | 0.2874 | 1.84667 | 23.79 |
| 30 | 15.3010 | 0.1139 | | |
| 31 | 45.4638 | 1.7467 | 1.48749 | 70.44 |
| 32 | −5.6918 | 1.8307 | | |
| 33 | ∞ | 2.1403 | 1.48749 | 70.44 |
| 34 | −6.2553 | 0.0481 | | |
| 35 | 10.2505 | 1.2309 | 1.80518 | 25.46 |
| 36 | 106.2585 | 2.8698 | | |
| 37 | ∞ | 7.5632 | 1.51680 | 64.20 |
| 38 | ∞ | | | |

First Optical Path Deflection Unit: Position of 5.7233 from Surface 12 to Reduction Side Second Optical Path Deflection Unit: Position of 6.1329 from Surface 20 to Reduction Side

TABLE 2

Example 1 Specification (d line)

| | |
|---|---|
| |f| | 1.00 |
| Bf | 7.85 |
| FNo. | 1.60 |
| 2ω [°] | 142.8 |

TABLE 3

Example 1 Aspheric Surface Coefficient

| | Surface Number | | |
|---|---|---|---|
| | 1 | 2 | 19 |
| KA | −5.857474705807E−01 | −3.045904939463E+00 | −3.157996796570E+00 |
| A3 | 3.679301621473E−02 | 4.504218568843E−02 | 0.000000000000E+00 |
| A4 | 1.069821274547E−03 | −1.604031184040E−02 | −2.966211871307E−04 |

TABLE 3-continued

Example 1 Aspheric Surface Coefficient

| A5 | −1.989694376873E−03 | 9.657333681444E−03 | 5.866228221438E−05 |
|---|---|---|---|
| A6 | 1.687893469734E−04 | −3.610959526651E−03 | 2.537059685540E−04 |
| A7 | 3.869010682476E−05 | 6.085985979555E−04 | −1.333167026742E−04 |
| A8 | −5.758063395038E−06 | −1.912634137375E−05 | −6.151584402159E−06 |
| A9 | −4.086204219635E−07 | −7.316083915146E−06 | 1.649928785226E−05 |
| A10 | 1.011705527669E−07 | 9.010171300917E−07 | −1.939136206339E−06 |
| A11 | 1.117900057303E−09 | −6.099334319771E−08 | −1.040882470435E−06 |
| A12 | −1.013851682207E−09 | 1.001725600557E−08 | 2.139437926399E−07 |
| A13 | 1.949790302277E−11 | −3.634955247556E−10 | 3.997085481423E−08 |
| A14 | 5.930736568440E−12 | −1.533862254589E−10 | −1.087810839552E−08 |
| A15 | −2.269581422374E−13 | 1.065399857358E−12 | −9.586961177685E−10 |
| A16 | −1.871891143278E−14 | 4.624898548275E−12 | 3.181123966824E−10 |
| A17 | 1.001020858432E−15 | −6.251936281803E−13 | 1.337021757293E−11 |
| A18 | 2.230317422502E−17 | 3.505027866598E−14 | −5.238902191532E−12 |
| A19 | −1.692144325241E−18 | −8.399688216104E−16 | −8.283537797371E−14 |
| A20 | 1.185964528401E−20 | 5.116282431100E−18 | 3.810033353715E−14 |

| | Surface Number | | |
|---|---|---|---|
| | 20 | 23 | 24 |
| KA | 6.455850110764E−01 | 1.026092724834E+00 | 9.622489260462E−01 |
| A3 | 0.000000000000E+00 | 0.000000000000E+00 | 0.000000000000E+00 |
| A4 | 5.800662137185E−04 | 9.542555804871E−04 | 9.271664997992E−04 |
| A5 | 5.971874049372E−04 | 2.527169488337E−04 | 5.955986921711E−05 |
| A6 | 2.763814295460E−05 | 1.827817770489E−05 | 1.194359931970E−04 |
| A7 | −1.190570325242E−04 | −2.437364683301E−05 | −2.636655327168E−05 |
| A8 | 7.248817182754E−06 | −4.466855764988E−06 | −1.929077758153E−05 |
| A9 | 1.428856925807E−05 | 1.538212582545E−06 | 5.794126973165E−06 |
| A10 | −2.222779148699E−06 | 6.518516339843E−07 | 1.256698492245E−06 |
| A11 | −1.014050617689E−06 | −7.559138875278E−08 | −5.084567620357E−07 |
| A12 | 2.154761400695E−07 | −5.143890640663E−08 | −3.783995669227E−08 |
| A13 | 4.351559295964E−08 | 2.734357004296E−09 | 2.386002891455E−08 |
| A14 | −1.088078749996E−08 | 2.371898183114E−09 | 2.320764137479E−10 |
| A15 | −1.115269686328E−09 | −6.101290334854E−11 | −6.338935053261E−10 |
| A16 | 3.125782491794E−10 | −6.501807226437E−11 | 1.734281946141E−11 |
| A17 | 1.571876563435E−11 | 6.743292010518E−13 | 9.012519830064E−12 |
| A18 | −4.879572741802E−12 | 9.927832839432E−13 | −4.673713582740E−13 |
| A19 | −9.363171300266E−14 | −2.306661909929E−15 | −5.335070654889E−14 |
| A20 | 3.233995721888E−14 | −6.530456465698E−15 | 3.763085618125E−15 |

Figure 8:
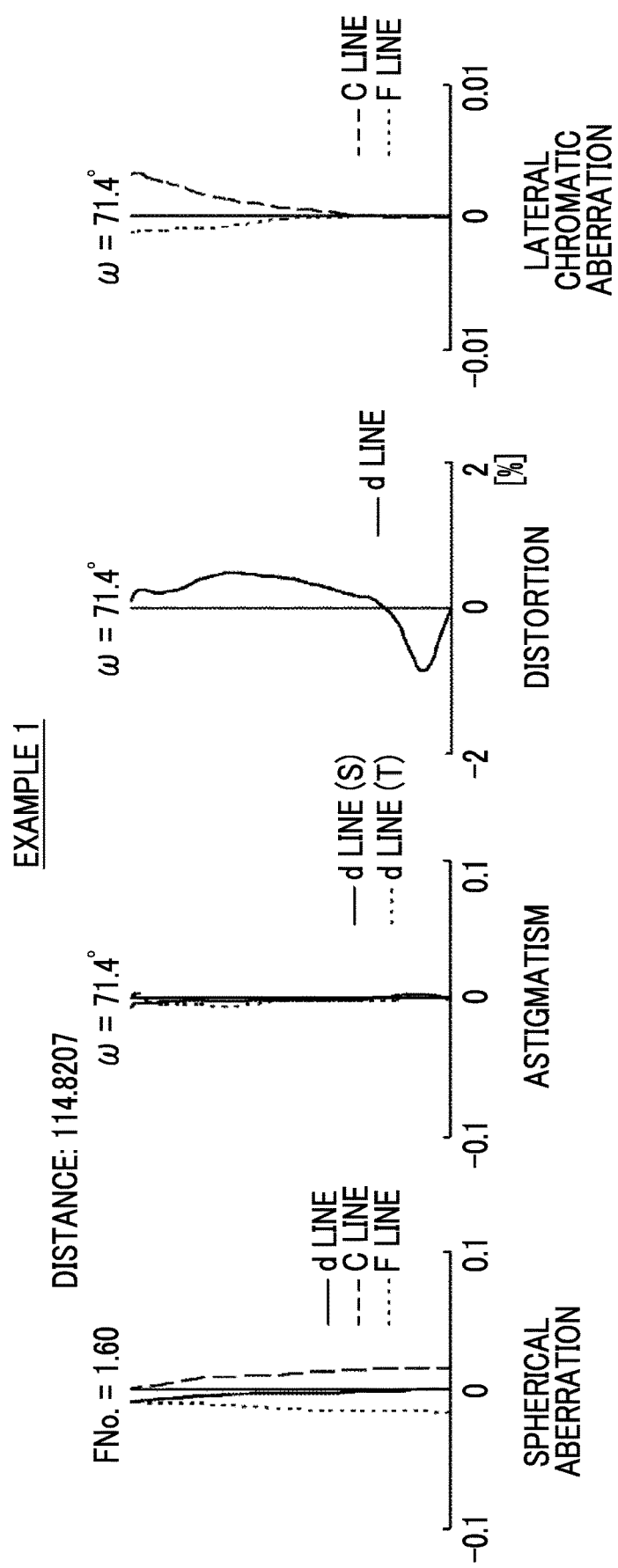
FIG. 8 is a diagram of aberrations of the imaging optical system of Example 1 of the present invention.

FIG. 8 shows a diagram of aberrations of the imaging optical system of Example 1. In addition, in order from the left side of FIG. 8, spherical aberration, astigmatism, distortion, and lateral chromatic aberration are shown in a case where the distance from the magnification side imaging surface to the first imaging optical system is set to 114.8207. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, ω means a half angle of view.

Figure 2:
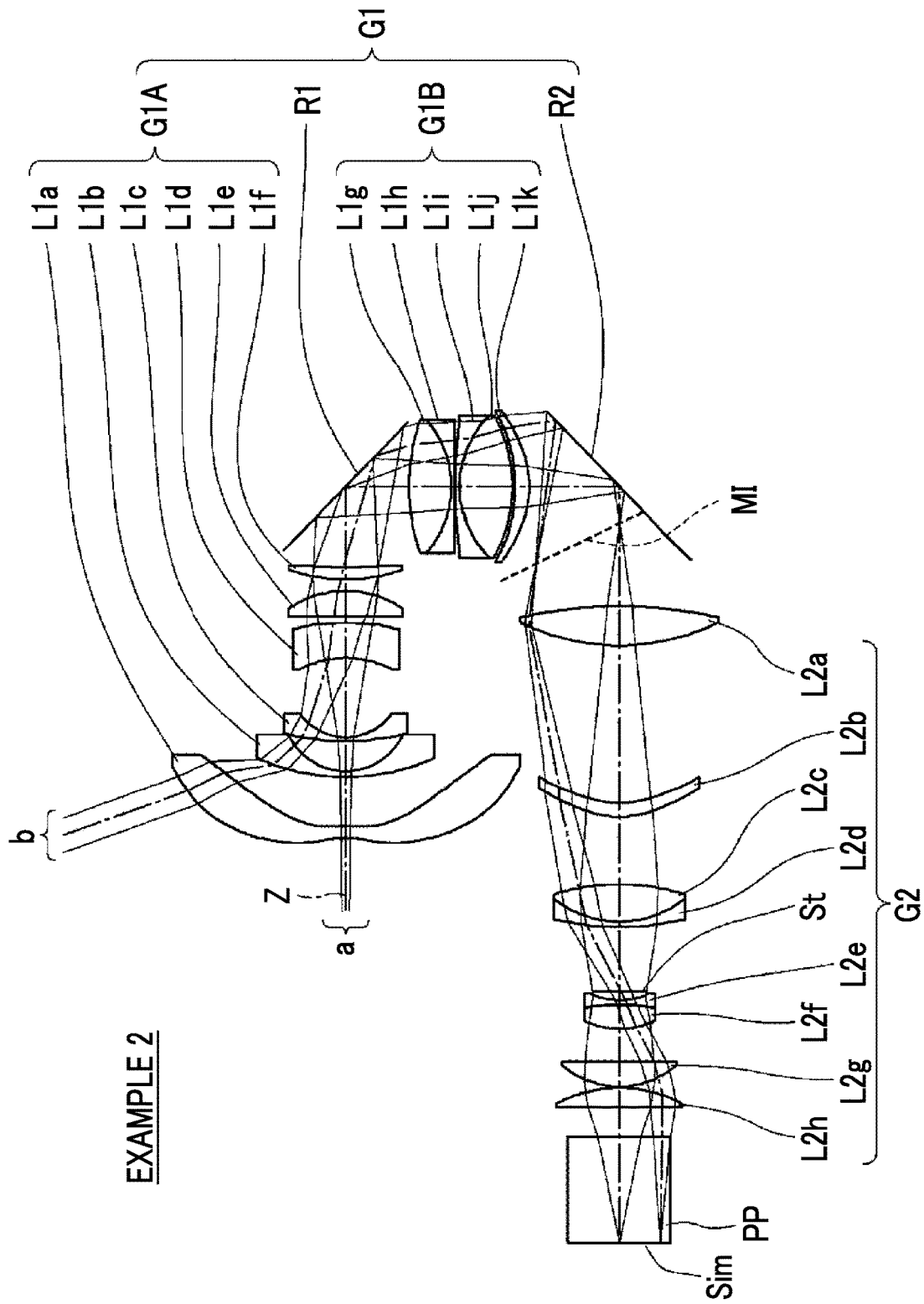
FIG. 2 is a cross-sectional view illustrating a lens configuration of an imaging optical system of Example 2 of the present invention.
Figure 9:
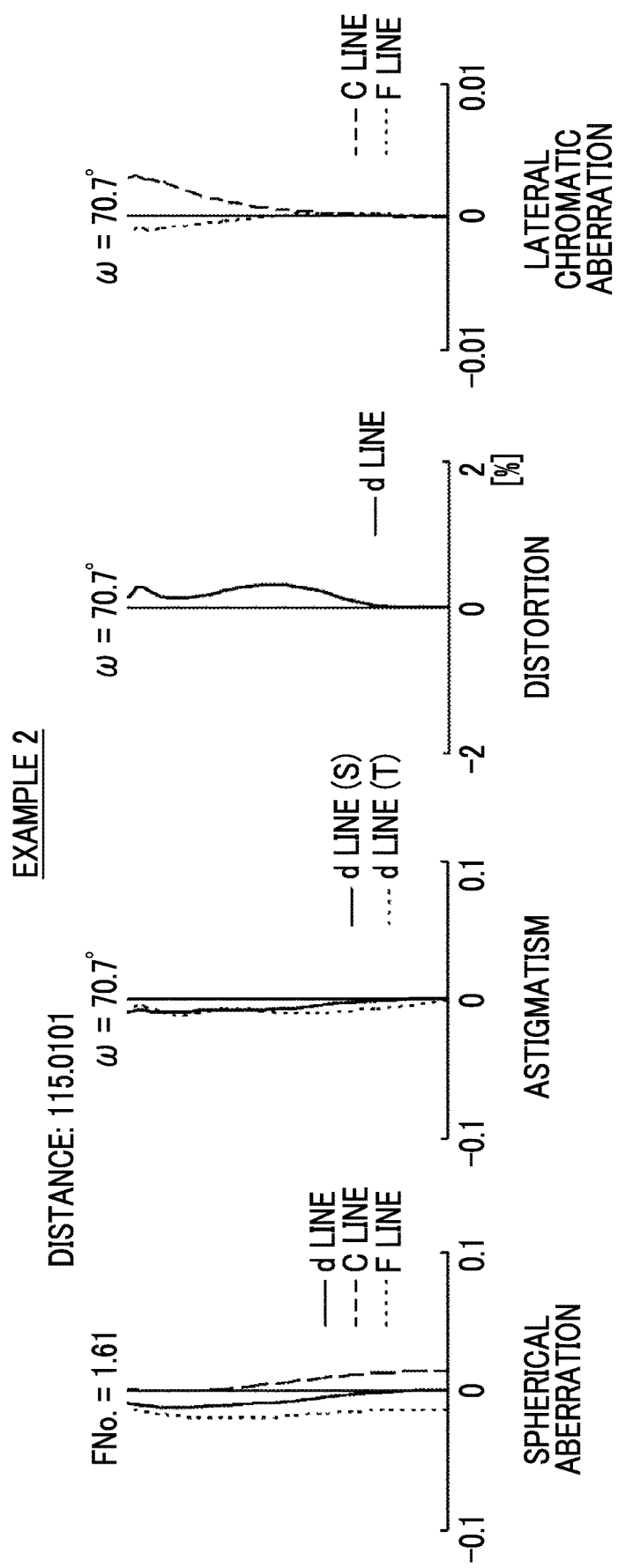
FIG. 9 is a diagram of aberrations of the imaging optical system of Example 2 of the present invention.

Next, an imaging optical system of Example 2 will be described. FIG. 2 is a cross-sectional view illustrating a lens configuration of the imaging optical system of Example 2. The group configuration of the imaging optical system of Example 2 is the same as that of the imaging optical system of Example 1. Further, Table 4 shows basic lens data of the imaging optical system of Example 2, Table 5 shows data about specification, and Table 6 shows data about aspheric surface coefficients. FIG. 9 shows aberration diagrams in a case where the distance from the magnification side imaging surface to the first imaging optical system is set to 115.0101.

TABLE 4

Example 2 Lens Data (n, ν are based on the d line)

| Surface Number | Radius of Curvature | Surface Distance | n | ν |
|---|---|---|---|---|
| *1 | −3.7585 | 0.7957 | 1.53158 | 55.08 |
| *2 | −8.0401 | 3.3948 | | |
| 3 | 15.8695 | 0.3858 | 1.83400 | 37.16 |
| 4 | 4.5335 | 2.0700 | | |
| 5 | 18.0974 | 0.2652 | 1.83481 | 42.72 |
| 6 | 4.1421 | 5.4106 | | |
| 7 | −7.2951 | 2.3605 | 1.62041 | 60.29 |
| 8 | −15.6110 | 0.4756 | | |
| 9 | −128.7318 | 1.6926 | 1.51680 | 64.20 |
| 10 | −7.1807 | 0.7883 | | |
| 11 | 13.3958 | 0.8174 | 1.80518 | 25.45 |
| 12 | 60.2272 | 10.0061 | | |
| 13 | 12.8980 | 3.0235 | 1.58913 | 61.13 |
| 14 | −6.7651 | 0.2532 | 1.80518 | 25.45 |
| 15 | ∞ | 0.0482 | | |
| 16 | 40.8735 | 0.2725 | 1.84667 | 23.79 |
| 17 | 6.8138 | 3.6697 | 1.49700 | 81.61 |
| 18 | −9.8240 | 0.1929 | | |
| *19 | −10.8537 | 1.0054 | 1.51007 | 56.24 |

TABLE 4-continued

Example 2 Lens Data (n, ν are based on the d line)

| Surface Number | Radius of Curvature | Surface Distance | n | ν |
|---|---|---|---|---|
| *20 | −6.1972 | 14.6017 | | |
| 21 | 34.4539 | 2.6522 | 1.51680 | 64.20 |
| 22 | −16.2418 | 10.7126 | | |
| *23 | −6.8147 | 0.9644 | 1.51007 | 56.24 |
| *24 | −6.3627 | 4.6076 | | |
| 25 | 15.7589 | 2.5437 | 1.80610 | 40.93 |
| 26 | −7.7281 | 0.3544 | 1.80518 | 25.45 |
| 27 | −21.5317 | 4.3617 | | |
| 28 (Stop) | ∞ | 0.6679 | | |
| 29 | −4.7407 | 0.2893 | 1.84667 | 23.79 |
| 30 | 13.3495 | 0.0574 | | |
| 31 | 20.5821 | 1.5986 | 1.48749 | 70.39 |
| 32 | −5.8117 | 2.2568 | | |
| 33 | ∞ | 1.7264 | 1.48749 | 70.39 |
| 34 | −6.3292 | 0.0940 | | |
| 35 | 9.9398 | 1.3165 | 1.80518 | 25.45 |
| 36 | ∞ | 2.1041 | | |
| 37 | ∞ | 7.2377 | 1.51680 | 64.20 |
| 38 | ∞ | | | |

First Optical Path Deflection Unit: Position of 5.5456 from Surface 12 to Reduction Side Second Optical Path Deflection Unit: Position of 6.3629 from Surface 20 to Reduction Side

TABLE 5

Example 2 Specification (d line)

| | |
|---|---|
| \|f'\| | 1.00 |
| Bf | 6.87 |
| FNo. | 1.61 |
| 2ω [°] | 141.4 |

TABLE 6

Example 2 Aspheric Surface Coefficient

| | Surface Number | | |
|---|---|---|---|
| | 1 | 2 | 19 |
| KA | −5.593097580800E−01 | −2.556658726600E+00 | −3.339548251400E+00 |
| A3 | 3.818152136777E−02 | 4.627007828465E−02 | 0.000000000000E+00 |
| A4 | 8.955457650633E−04 | −1.605773668809E−02 | −2.498910665810E−04 |
| A5 | −2.093264598623E−03 | 9.754938231208E−03 | 2.395028631716E−04 |
| A6 | 1.919463636510E−04 | −3.740551644934E−03 | 1.295531524626E−04 |
| A7 | 4.087209244613E−05 | 6.447058302961E−04 | −2.469518706831E−04 |
| A8 | −6.560155665836E−06 | −2.033068948521E−05 | 4.237298794610E−05 |
| A9 | −4.331127611294E−07 | −8.160835907581E−06 | 3.152925784996E−05 |
| A10 | 1.180957948820E−07 | 9.830687764736E−07 | −9.169397653509E−06 |
| A11 | 1.046004163784E−09 | −5.375047730516E−08 | −1.903702775213E−06 |
| A12 | −1.231691858028E−09 | 9.686687955545E−09 | 7.620087484988E−07 |
| A13 | 2.488259729741E−11 | −5.376218850489E−10 | 6.093046230289E−08 |
| A14 | 7.619629721181E−12 | −1.494240680715E−10 | −3.422347836854E−08 |
| A15 | −2.904512047840E−13 | 2.347754419692E−12 | −9.649786561674E−10 |
| A16 | −2.603132485438E−14 | 4.889295105059E−12 | 8.884589960874E−10 |
| A17 | 1.332955822616E−15 | −6.886535612120E−13 | 4.946323833261E−12 |
| A18 | 3.648354684847E−17 | 3.918158969827E−14 | −1.284503489121E−11 |
| A19 | −2.363102397354E−18 | −9.182613961294E−16 | 2.197401454678E−14 |
| A20 | 7.988019927906E−21 | 4.367917763341E−18 | 8.272070814561E−14 |

| | Surface Number | | |
|---|---|---|---|
| | 20 | 23 | 24 |
| KA | 7.219273637200E−01 | 1.006607721300E+00 | 9.841074191200E−01 |
| A3 | 0.000000000000E+00 | 0.000000000000E+00 | 0.000000000000E+00 |
| A4 | 5.028801140542E−04 | 1.095152250130E−03 | 1.092767251833E−03 |
| A5 | 9.192092095836E−04 | 3.278310230919E−04 | 8.081891570930E−05 |
| A6 | −1.319436268683E−04 | −7.873437606356E−05 | 4.824493977934E−05 |
| A7 | −1.822686333763E−04 | −2.911835195199E−05 | −1.983951411762E−05 |
| A8 | 3.513562993986E−05 | 1.675479449721E−05 | −9.916649583671E−06 |
| A9 | 2.268051805613E−05 | −7.872379797434E−07 | 5.063150256056E−06 |
| A10 | −5.002510178664E−06 | −1.213649987431E−06 | 5.055400004318E−07 |
| A11 | −1.763693995016E−06 | 2.585978268356E−07 | −5.039070663446E−07 |
| A12 | 4.084159082068E−07 | 2.719153598058E−08 | 5.287890782622E−09 |
| A13 | 8.631401152011E−08 | −1.678120378143E−08 | 2.631469737828E−08 |
| A14 | −2.023431179950E−08 | 1.007848085468E−09 | −1.546268241552E−09 |
| A15 | −2.589384984150E−09 | 5.209615055493E−10 | −7.704143873876E−10 |
| A16 | 6.104357704782E−10 | −7.247850527207E−11 | 6.558832384178E−11 |
| A17 | 4.340590655670E−11 | −8.063985851440E−12 | 1.201567519197E−11 |
| A18 | −1.039247727115E−11 | 1.581305207016E−12 | −1.217602576736E−12 |
| A19 | −3.105541993297E−13 | 5.005942176497E−14 | −7.789340589649E−14 |
| A20 | 7.678698576684E−14 | −1.243131588608E−14 | 8.738184397226E−15 |

Figure 3:
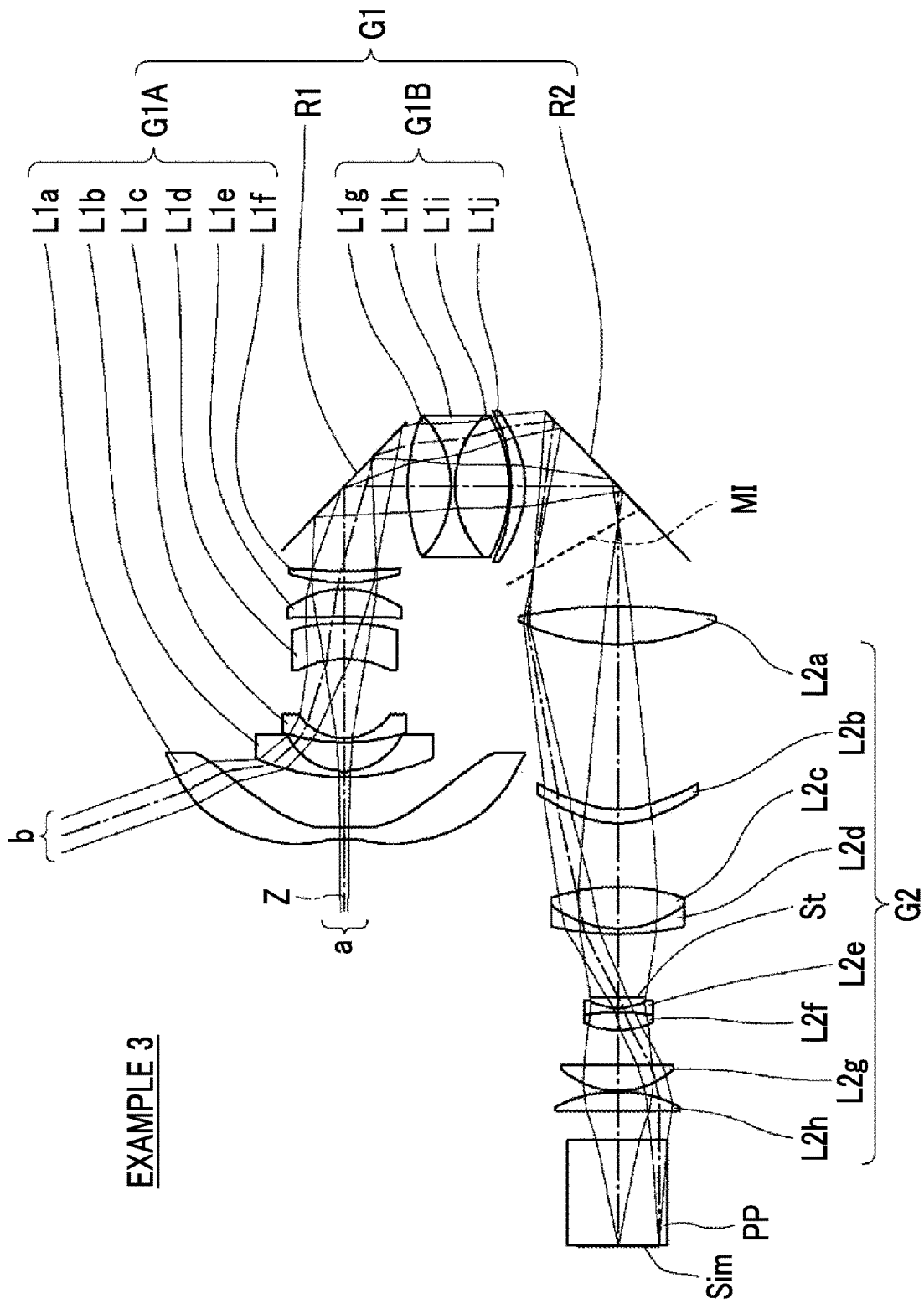
FIG. 3 is a cross-sectional view illustrating a lens configuration of an imaging optical system of Example 3 of the present invention.
Figure 10:
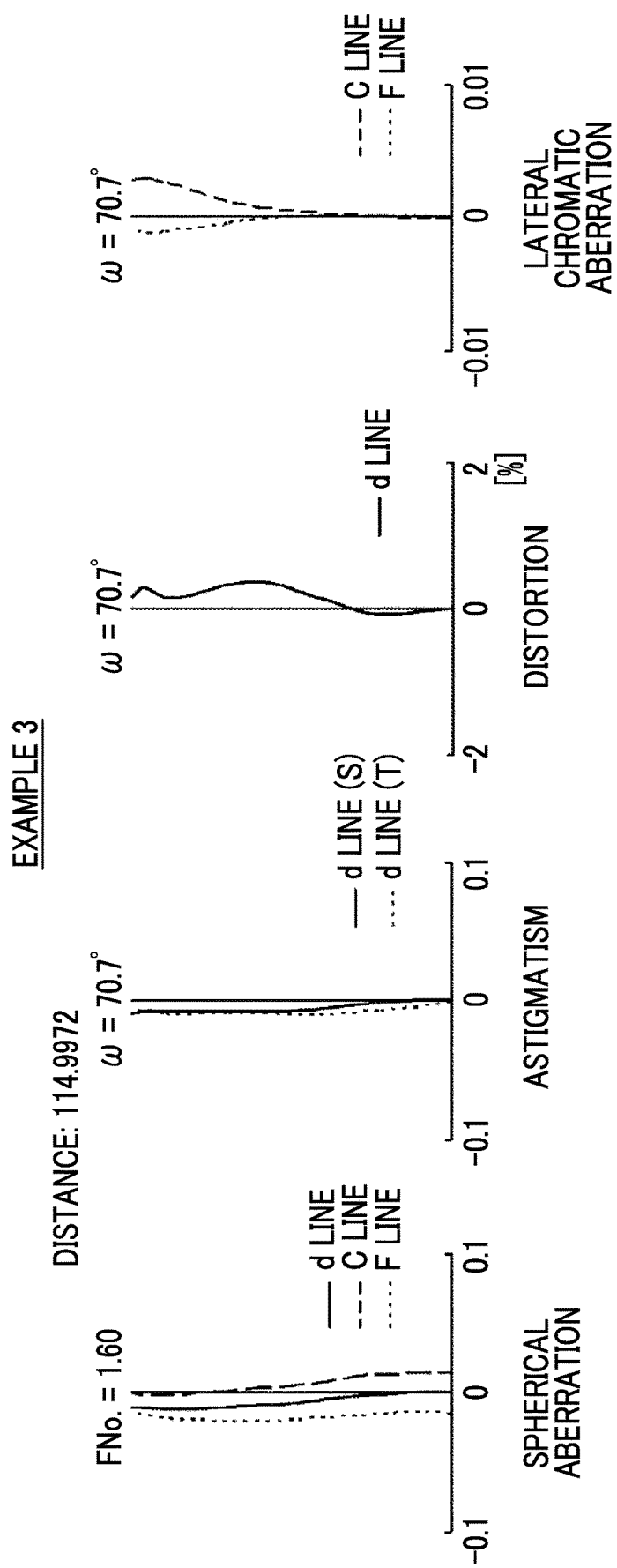
FIG. 10 is a diagram of aberrations of the imaging optical system of Example 3 of the present invention.

Next, an imaging optical system of Example 3 will be described. FIG. 3 is a cross-sectional view illustrating a lens configuration of the imaging optical system of Example 3. The group configuration of the imaging optical system of Example 3 is the same as that of the imaging optical system of Example 1 except that the first B lens group G1B is composed of four lenses L1g to L1j. Further, Table 7 shows basic lens data of the imaging optical system of Example 3, Table 8 shows data about specification, and Table 9 shows data about aspheric surface coefficients. FIG. 10 shows aberration diagrams in a case where the distance from the magnification side imaging surface to the first imaging optical system is set to 114.9972.

TABLE 7

Example 3 Lens Data (n, ν are based on the d line)

| Surface Number | Radius of Curvature | Surface Distance | n | ν |
|---|---|---|---|---|
| *1 | −3.7726 | 0.7956 | 1.53158 | 55.08 |
| *2 | −8.1387 | 3.4258 | | |
| 3 | 15.8263 | 0.3857 | 1.83400 | 37.16 |
| 4 | 4.5501 | 1.9947 | | |
| 5 | 15.6568 | 0.2652 | 1.83481 | 42.72 |
| 6 | 4.0566 | 5.4517 | | |
| 7 | −7.0702 | 2.3964 | 1.62041 | 60.29 |
| 8 | −14.8873 | 0.4580 | | |
| 9 | −67.3272 | 1.8467 | 1.51680 | 64.20 |
| 10 | −7.0808 | 0.4782 | | |
| 11 | 13.1201 | 0.8028 | 1.80518 | 25.46 |
| 12 | 54.4079 | 10.2340 | | |
| 13 | 11.9969 | 3.0859 | 1.60311 | 60.64 |
| 14 | −6.9321 | 0.2917 | 1.80518 | 25.46 |
| 15 | 6.9321 | 3.7585 | 1.49700 | 81.61 |
| 16 | −9.2565 | 0.1205 | | |
| *17 | −11.7987 | 1.0126 | 1.51007 | 56.24 |
| *18 | −6.3553 | 14.7616 | | |
| 19 | 35.9863 | 2.5868 | 1.51680 | 64.20 |
| 20 | −16.4946 | 11.2634 | | |
| *21 | −6.8825 | 0.9643 | 1.51007 | 56.24 |
| *22 | −6.4239 | 4.3540 | | |
| 23 | 15.8275 | 2.8520 | 1.80610 | 40.95 |
| 24 | −7.7545 | 0.3930 | 1.80518 | 25.46 |
| 25 | −21.4583 | 4.2768 | | |
| 26 (Stop) | ∞ | 0.7522 | | |
| 27 | −4.8325 | 0.2869 | 1.84667 | 23.79 |
| 28 | 12.7454 | 0.0702 | | |
| 29 | 20.9920 | 1.1934 | 1.48749 | 70.44 |
| 30 | −5.8836 | 2.3940 | | |
| 31 | ∞ | 1.7455 | 1.48749 | 70.44 |
| 32 | −6.0929 | 0.0482 | | |
| 33 | 9.8851 | 1.3139 | 1.80518 | 25.46 |
| 34 | ∞ | 2.1091 | | |
| 35 | ∞ | 7.2369 | 1.51680 | 64.20 |
| 36 | ∞ | | | |

First Optical Path Deflection Unit: Position of 5.7240 from Surface 12 to Reduction Side
Second Optical Path Deflection Unit: Position of 6.5575 from Surface 18 to Reduction Side

TABLE 8

Example 3 Specification (d line)

| |f'| | 1.00 |
|---|---|
| Bf' | 6.87 |
| FNo. | 1.60 |
| 2ω [°] | 141.4 |

TABLE 9

Example 3 Aspheric Surface Coefficient

| | Surface Number | | |
|---|---|---|---|
| | 1 | 2 | 17 |
| KA | −5.382593290200E−01 | −2.530226029600E+00 | −4.179491334000E+00 |
| A3 | 3.770581096924E−02 | 4.605687426480E−02 | 0.000000000000E+00 |
| A4 | 1.160117392383E−03 | −1.627009075949E−02 | −2.336216825630E−05 |
| A5 | −2.074102252012E−03 | 1.015901712329E−02 | 9.150367359777E−05 |
| A6 | 1.775704600058E−04 | −3.890262945145E−03 | 1.099556310415E−04 |
| A7 | 4.092553270447E−05 | 6.674188724526E−04 | −1.912551318796E−04 |
| A8 | −6.177968646157E−06 | −2.104870755764E−05 | 3.655199651742E−05 |
| A9 | −4.472801754792E−07 | −8.419347323476E−06 | 2.423255278548E−05 |
| A10 | 1.121857428250E−07 | 1.034154663542E−06 | −7.874619032768E−06 |
| A11 | 1.366421221680E−09 | −6.215917432548E−08 | −1.421969939099E−06 |
| A12 | −1.175170527237E−09 | 1.074201523630E−08 | 6.576376740679E−07 |
| A13 | 2.133903037947E−11 | −5.203778044723E−10 | 4.395078076727E−08 |
| A14 | 7.282474698598E−12 | −1.678245293545E−10 | −3.002192061234E−08 |
| A15 | −2.685946777642E−13 | 2.082346470712E−12 | −6.655405545665E−10 |
| A16 | −2.482827537584E−14 | 5.442132425670E−12 | 7.998864049358E−10 |
| A17 | 1.260524657243E−15 | −7.629836353397E−13 | 2.993677908663E−12 |
| A18 | 3.422152430348E−17 | 4.359551801919E−14 | −1.189142273227E−11 |
| A19 | −2.261884336093E−18 | −1.036661772777E−15 | 1.940188426131E−14 |
| A20 | 9.532905654905E−21 | 5.340924364173E−18 | 7.774435111728E−14 |

| | Surface Number | | |
|---|---|---|---|
| | 18 | 21 | 22 |
| KA | 7.218865145900E−01 | 9.741667729400E−01 | 9.735363792500E−01 |
| A3 | 0.000000000000E+00 | 0.000000000000E+00 | 0.000000000000E+00 |
| A4 | 6.009116126546E−04 | 9.219582450107E−04 | 9.683459492818E−04 |
| A5 | 8.396762543868E−04 | 2.637976603150E−04 | 2.659232812473E−05 |
| A6 | −1.523569837803E−04 | −1.975243126524E−05 | 8.409445459370E−05 |

TABLE 9-continued

Example 3 Aspheric Surface Coefficient

| A7 | −1.488802357629E−04 | −2.281220591856E−05 | −9.382649725204E−06 |
|---|---|---|---|
| A8 | 3.599536114852E−05 | 5.588330580994E−06 | −1.708554935382E−05 |
| A9 | 1.751465792402E−05 | −3.471765525694E−07 | 4.090528293959E−06 |
| A10 | −4.800860614812E−06 | −1.693686932711E−07 | 1.256896330225E−06 |
| A11 | −1.315997311554E−06 | 1.414333743274E−07 | −4.442905604476E−07 |
| A12 | 3.755878497432E−07 | −2.474530960126E−08 | −4.239987690222E−08 |
| A13 | 6.277374089347E−08 | −8.143844930144E−09 | 2.354849439911E−08 |
| A14 | −1.784700439409E−08 | 2.309426886774E−09 | 4.180255781634E−10 |
| A15 | −1.850574123998E−09 | 2.107372461948E−10 | −6.803957862847E−10 |
| A16 | 5.129896022972E−10 | −8.268915569418E−11 | 1.351870040228E−11 |
| A17 | 3.077646590605E−11 | −2.515739916335E−12 | 1.032363681867E−11 |
| A18 | −8.264055774684E−12 | 1.405995895124E−12 | −4.146778866129E−13 |
| A19 | −2.206226928963E−13 | 1.050754767134E−14 | −6.461131996054E−14 |
| A20 | 5.749140254064E−14 | −9.499685137065E−15 | 3.325643773021E−15 |

Figure 4:
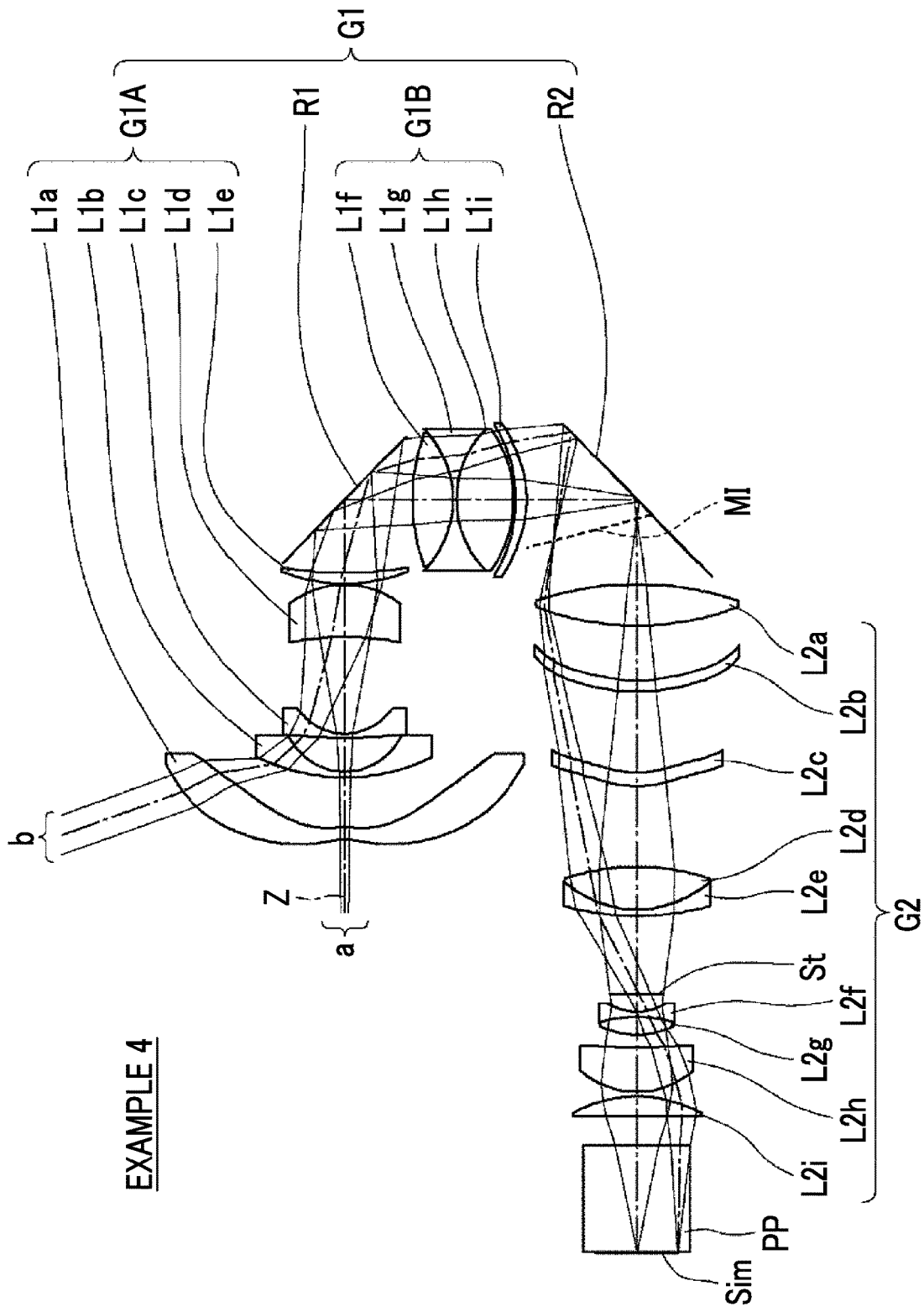
FIG. 4 is a cross-sectional view illustrating a lens configuration of an imaging optical system of Example 4 of the present invention.
Figure 11:
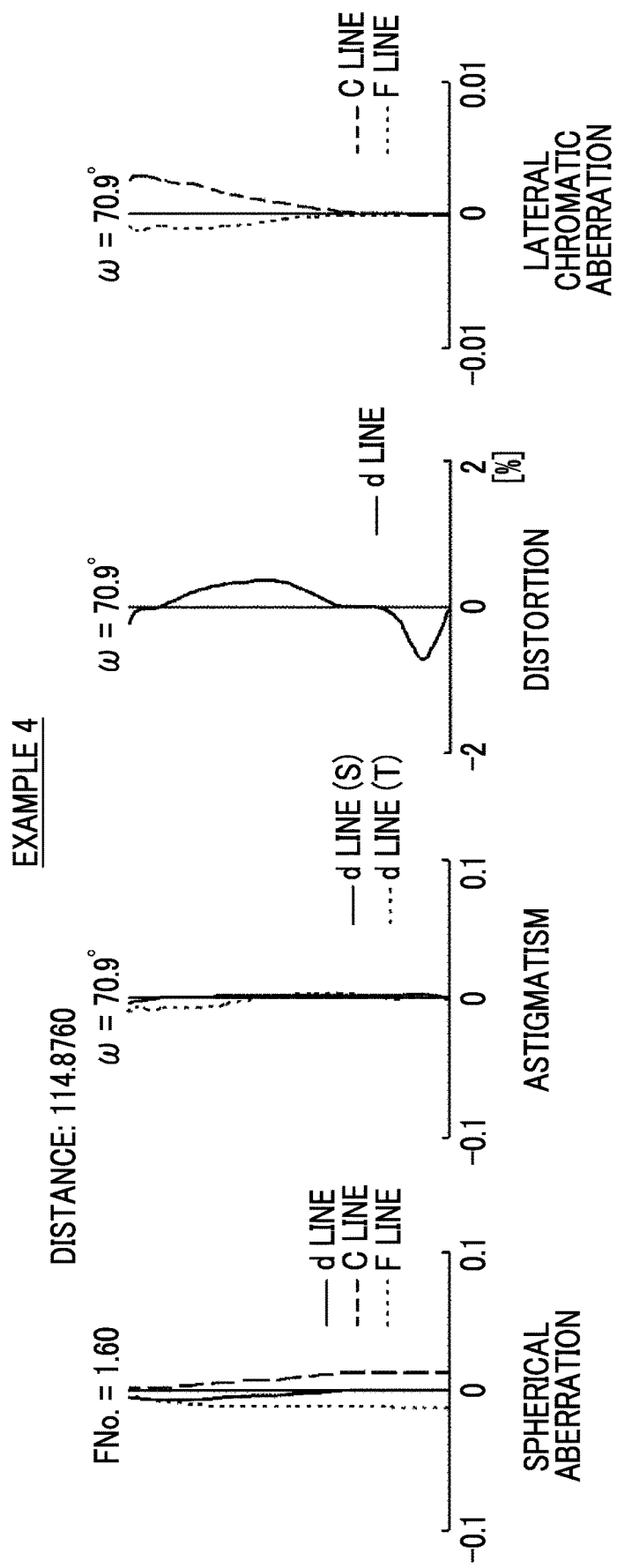
FIG. 11 is a diagram of aberrations of the imaging optical system of Example 4 of the present invention.

Next, an imaging optical system of Example 4 will be described. FIG. 4 is a cross-sectional view illustrating a lens configuration of the imaging optical system of Example 4. The group configuration of the imaging optical system of Example 4 is the same as that of the imaging optical system of Example 1 except the following points. The first A lens group G1A is composed of five lenses L1a to L1e, the first B lens group G1B is composed of four lenses L1f to L1i, and the second imaging optical system G2 is composed of nine lenses L2a to L2i and an aperture stop St. Further, Table 10 shows basic lens data of the imaging optical system of Example 4, Table 11 shows data about specification, and Table 12 shows data about aspheric surface coefficients. FIG. 11 shows aberration diagrams in a case where the distance from the magnification side imaging surface to the first imaging optical system is set to 114.8760.

TABLE 10

Example 4 Lens Data (n, ν are based on the d line)

| Surface Number | Radius of Curvature | Surface Distance | n | ν |
|---|---|---|---|---|
| *1 | −4.0080 | 0.7994 | 1.53158 | 55.08 |
| *2 | −8.4314 | 3.4485 | | |
| 3 | 14.5723 | 0.3980 | 1.83481 | 42.72 |
| 4 | 4.5077 | 2.2979 | | |
| 5 | 37.7511 | 0.2834 | 1.83481 | 42.72 |
| 6 | 4.1091 | 6.6375 | | |
| 7 | −19.5674 | 3.5638 | 1.48749 | 70.24 |
| 8 | −6.4464 | 0.0484 | | |
| 9 | 12.0307 | 0.7747 | 1.84667 | 23.79 |
| 10 | 31.9799 | 9.7968 | | |
| 11 | 12.9561 | 2.8439 | 1.62041 | 60.29 |
| 12 | −6.8017 | 0.2599 | 1.80518 | 25.46 |
| 13 | 6.6795 | 4.0277 | 1.49700 | 81.61 |
| 14 | −8.1690 | 0.1348 | | |
| *15 | −9.7623 | 0.8016 | 1.51007 | 56.24 |
| *16 | −6.5345 | 13.5556 | | |
| 17 | 23.2268 | 2.8208 | 1.51680 | 64.20 |
| 18 | −20.5472 | 3.7612 | | |
| *19 | −13.1694 | 0.7786 | 1.51007 | 56.24 |
| *20 | −14.8313 | 5.5131 | | |
| *21 | −6.8711 | 0.9635 | 1.51007 | 56.24 |
| *22 | −6.7669 | 5.4689 | | |
| 23 | 16.9274 | 2.9074 | 1.78590 | 44.20 |
| 24 | −7.9306 | 0.4621 | 1.80518 | 25.46 |
| 25 | −19.2791 | 5.2742 | | |
| 26 (Stop) | ∞ | 1.1883 | | |
| 27 | −4.1996 | 0.3564 | 1.84667 | 23.79 |
| 28 | 8.8424 | 1.2417 | 1.53996 | 59.73 |
| 29 | −6.1726 | 0.8260 | | |
| 30 | −77.8408 | 3.0645 | 1.65844 | 50.88 |
| 31 | −6.2928 | 0.3347 | | |
| 32 | 9.8013 | 1.3159 | 1.80518 | 25.46 |
| 33 | 440.8022 | 2.0574 | | |
| 34 | ∞ | 7.2981 | 1.51633 | 64.14 |
| 35 | ∞ | | | |

First Optical Path Deflection Unit: Position of 4.8166 from Surface 10 to Reduction Side Second Optical Path Deflection Unit: Position of 7.7756 from Surface 16 to Reduction Side

TABLE 11

Example 4 Specification (d line)

| |f′| | 1.00 |
|---|---|
| Bf′ | 6.86 |
| FNo. | 1.60 |
| 2ω [°] | 141.8 |

TABLE 12

Example 4 Aspheric Surface Coefficient

| | Surface Number | | | |
|---|---|---|---|---|
| | 1 | 2 | 15 | 16 |
| KA | −5.083375748464E−01 | −4.975261640681E+00 | −2.544582602423E+00 | 6.235976961097E−01 |
| A3 | 3.570519882185E−02 | 4.342394787518E−02 | 0.000000000000E+00 | 0.000000000000E+00 |
| A4 | 1.334322246960E−03 | −1.491132209660E−02 | 5.092393877876E−05 | 1.154737009466E−03 |
| A5 | −1.953641876180E−03 | 9.120691695659E−03 | −3.407182764245E−04 | 2.065701728208E−04 |
| A6 | 1.522218988464E−04 | −3.501611261562E−03 | 3.422578466739E−04 | 1.237644354051E−05 |
| A7 | 3.917000899784E−05 | 5.930622057665E−04 | −1.326983405321E−04 | −3.501142144594E−05 |

TABLE 12-continued

Example 4 Aspheric Surface Coefficient

| | | | | |
|---|---|---|---|---|
| A8  | −5.332658122445E−06 | −1.697953687748E−05 | −9.907523891250E−06 | −8.507619416673E−06 |
| A9  | −4.534177884961E−07 | −7.278404742103E−06 | 1.754306763995E−05  | 4.781095900867E−06  |
| A10 | 9.661407188132E−08  | 8.132402114086E−07  | −2.463185992279E−06 | 9.273570001234E−07  |
| A11 | 2.036506027292E−09  | −4.821414751440E−08 | −7.493318120045E−07 | −3.731008186255E−07 |
| A12 | −1.006822599606E−09 | 9.683489890095E−09  | 2.133841891534E−07  | −8.032534345778E−08 |
| A13 | 1.032834121084E−11  | −4.562558345830E−10 | −1.040232832358E−09 | 1.753385902592E−08  |
| A14 | 6.220857807261E−12  | −1.425143884727E−10 | −5.174835912096E−09 | 5.136686355177E−09  |
| A15 | −1.789612314433E−13 | 2.034703645760E−12  | 1.065032662004E−09  | −5.059576803614E−10 |
| A16 | −2.140557524884E−14 | 4.158957010810E−12  | −6.686047743062E−11 | −1.988970633565E−10 |
| A17 | 8.805331292302E−16  | −5.637330044618E−13 | −3.175319065149E−11 | 8.341959748897E−12  |
| A18 | 3.165689308453E−17  | 3.120783030629E−14  | 4.843944728550E−12  | 4.073569777554E−12  |
| A19 | −1.591441394087E−18 | −7.307476065433E−16 | 3.024912820879E−13  | −6.013711519204E−14 |
| A20 | 6.245560608872E−22  | 4.169137056712E−18  | −5.800179252543E−14 | −3.396043839417E−14 |

| | Surface Number | | | |
|---|---|---|---|---|
| | 19 | 20 | 21 | 22 |
| KA  | 1.000000000000E+00  | 1.000000000000E+00  | 1.000000000000E+00  | 1.000000000000E+00  |
| A3  | 0.000000000000E+00  | 0.000000000000E+00  | 0.000000000000E+00  | 0.000000000000E+00  |
| A4  | −2.608123459409E−04 | −5.326465259268E−04 | 1.048990490185E−03  | 1.130598490400E−03  |
| A5  | −3.661979161398E−05 | 9.695150899208E−05  | 4.540481608739E−04  | 2.431770237873E−04  |
| A6  | 4.700032854755E−05  | 2.250536682963E−05  | 1.502308164538E−05  | 2.261994897445E−05  |
| A7  | 1.938515029340E−06  | 1.578992536924E−06  | −3.431406812733E−05 | −2.550088766597E−06 |
| A8  | −2.279270338461E−06 | −1.861272603754E−06 | 5.835228261311E−06  | −5.845776685629E−06 |
| A9  | −6.292183647086E−08 | −1.111539872669E−08 | −5.322205772217E−07 | 2.054963323321E−07  |
| A10 | 6.962749584386E−08  | 4.091734793108E−08  | −4.005702305110E−07 | 6.074465736828E−07  |
| A11 | 1.307152192594E−09  | 3.200681399506E−10  | 2.380579880957E−07  | −4.054203229434E−08 |
| A12 | −1.644981492989E−09 | −6.823532265192E−10 | −1.406956617544E−08 | −4.093172189523E−08 |
| A13 | −1.654572889704E−11 | −5.343371040783E−12 | −1.569432700989E−08 | 2.519569496181E−09  |
| A14 | 2.363381279074E−11  | 8.380054801822E−12  | 2.271995723998E−09  | 1.762149593940E−09  |
| A15 | 8.586519630069E−14  | 3.009108765880E−14  | 4.869777098309E−10  | −7.639049280247E−11 |
| A16 | −1.414866814040E−13 | −4.880193450801E−14 | −9.171783558132E−11 | −4.590549120655E−11 |
| A17 | 0.000000000000E+00  | 0.000000000000E+00  | −7.442078729488E−12 | 1.184923740675E−12  |
| A18 | 0.000000000000E+00  | 0.000000000000E+00  | 1.636267968371E−12  | 6.600228363493E−13  |
| A19 | 0.000000000000E+00  | 0.000000000000E+00  | 4.495890970682E−14  | −7.572587675479E−15 |
| A20 | 0.000000000000E+00  | 0.000000000000E+00  | −1.116802158607E−14 | −4.021887866841E−15 |

Figure 5:
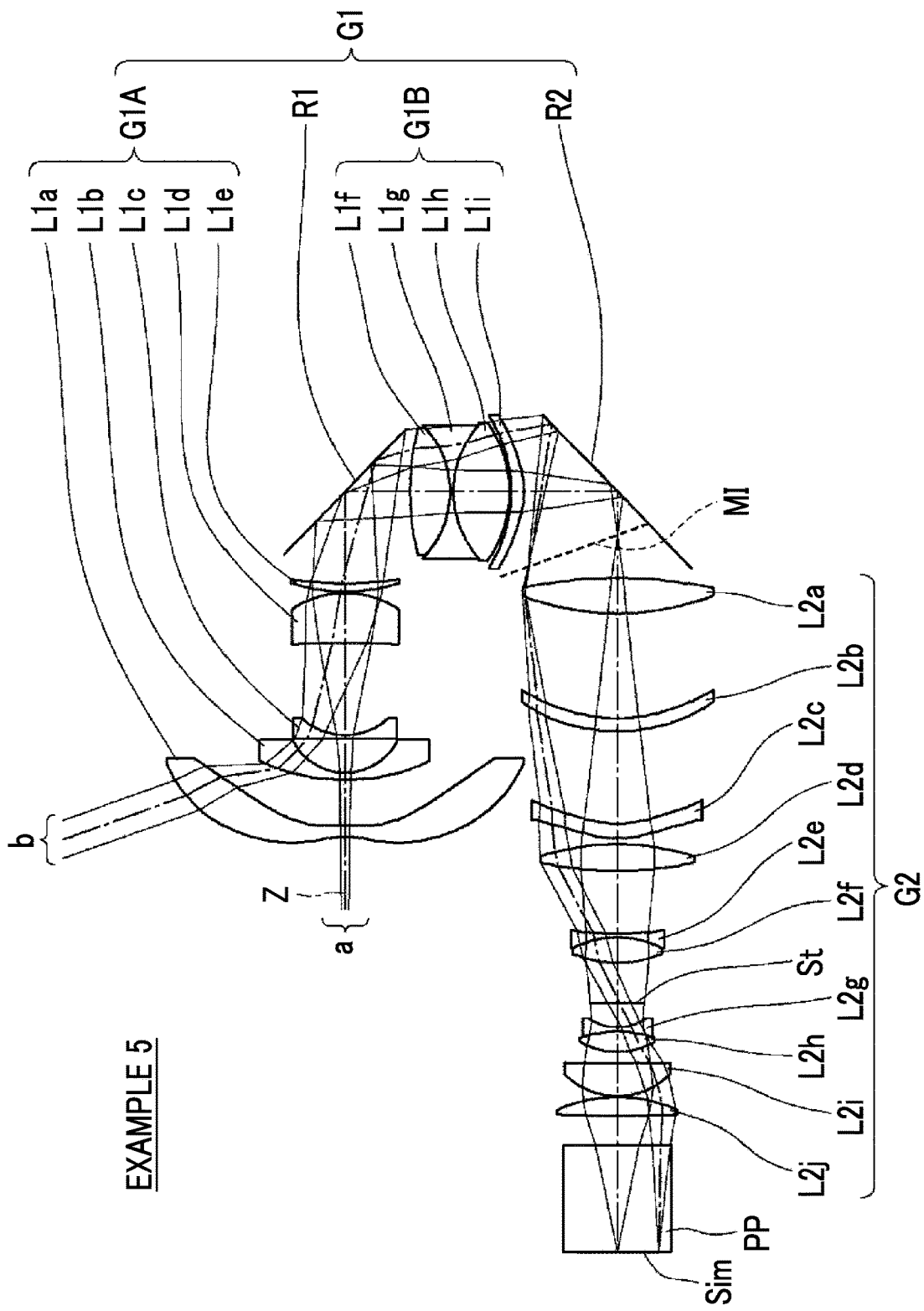
FIG. 5 is a cross-sectional view illustrating a lens configuration of an imaging optical system of Example 5 of the present invention.
Figure 12:
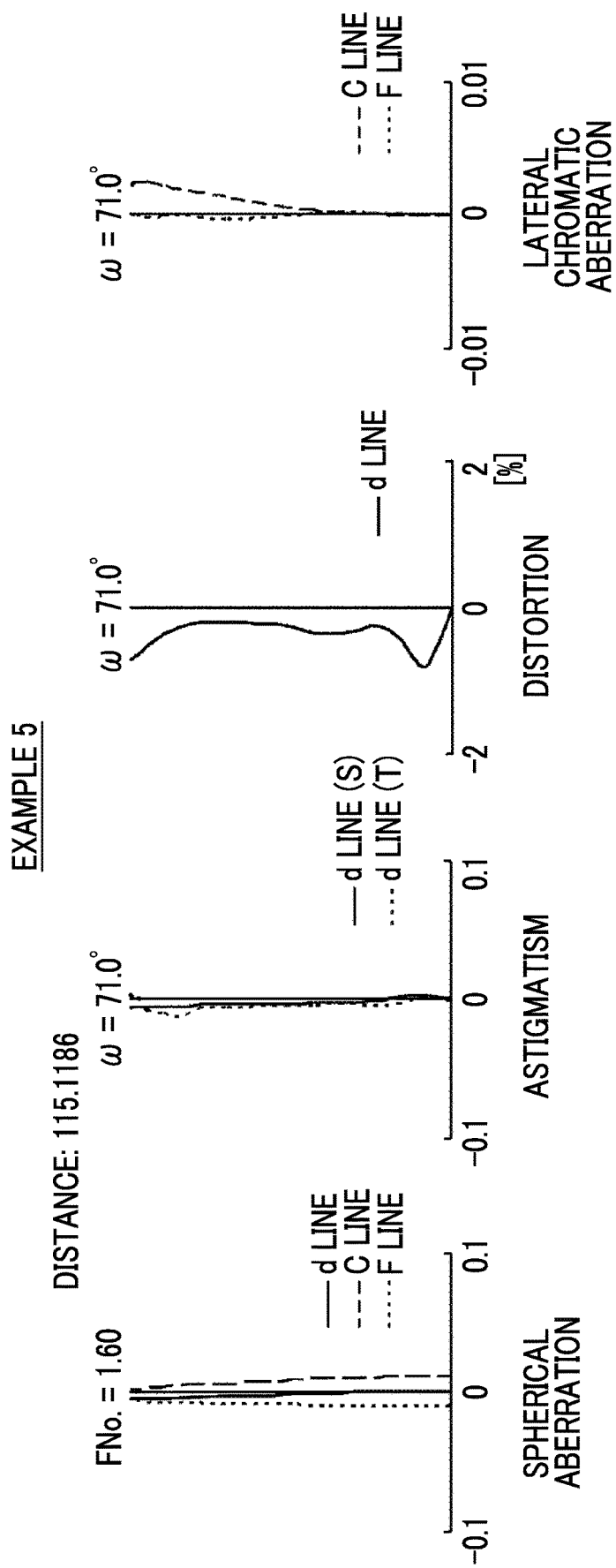
FIG. 12 is a diagram of aberrations of the imaging optical system of Example 5 of the present invention.

Next, an imaging optical system of Example 5 will be described. FIG. 5 is a cross-sectional view illustrating a lens configuration of the imaging optical system of Example 5. The group configuration of the imaging optical system of Example 5 is the same as that of the imaging optical system of Example 1 except the following points. The first A lens group G1A is composed of five lenses L1a to L1e, the first B lens group G1B is composed of four lenses L1f to L1i, and the second imaging optical system G2 is composed of ten lenses L2a to L2j and an aperture stop St. Further, Table 13 shows basic lens data of the imaging optical system of Example 5, Table 14 shows data about specification, and Table 15 shows data about aspheric surface coefficients. FIG. 12 shows aberration diagrams in a case where the distance from the magnification side imaging surface to the first imaging optical system is set to 115.1186.

TABLE 13

Example 5 Lens Data (n, ν are based on the d line)

| Surface Number | Radius of Curvature | Surface Distance | n | ν |
|---|---|---|---|---|
| *1 | −3.9859 | 0.7974 | 1.53158 | 55.08 |
| *2 | −8.6887 | 3.0932 | | |
| 3  | 14.8641 | 0.4827 | 1.89190 | 37.13 |
| 4  | 4.2155  | 2.3221 | | |
| 5  | 1290.2994 | 0.2655 | 1.83481 | 42.72 |
| 6  | 4.5932  | 6.3727 | | |
| 7  | −45.5827 | 3.4233 | 1.48749 | 70.24 |
| 8  | −6.8232 | 0.0675 | | |
| 9  | 12.5011 | 0.6059 | 1.84666 | 23.78 |

TABLE 13-continued

Example 5 Lens Data (n, ν are based on the d line)

| Surface Number | Radius of Curvature | Surface Distance | n | ν |
|---|---|---|---|---|
| 10  | 32.7029   | 10.8537 | | |
| 11  | 15.4448   | 2.8833  | 1.65160 | 58.55 |
| 12  | −6.3403   | 0.2412  | 1.80518 | 25.42 |
| 13  | 6.7772    | 3.9547  | 1.49700 | 81.61 |
| 14  | −8.0446   | 0.1205  | | |
| *15 | −8.5655   | 0.8900  | 1.51007 | 56.24 |
| *16 | −6.0276   | 12.5770 | | |
| 17  | 34.8631   | 2.4132  | 1.51680 | 64.20 |
| 18  | −19.3546  | 7.2102  | | |
| *19 | −12.6681  | 0.8857  | 1.51007 | 56.24 |
| *20 | −13.6943  | 6.3514  | | |
| *21 | −7.0470   | 1.0125  | 1.51007 | 56.24 |
| *22 | −7.2466   | 0.4013  | | |
| 23  | 18.6776   | 1.8415  | 1.83481 | 42.72 |
| 24  | −25.2393  | 4.3302  | | |
| 25  | −21.5680  | 0.2413  | 1.84666 | 23.78 |
| 26  | 7.2598    | 1.7329  | 1.63930 | 44.87 |
| 27  | −8.7848   | 2.7029  | | |
| 28 (Stop) | ∞   | 1.6722  | | |
| 29  | −3.7136   | 0.2704  | 1.80100 | 34.97 |
| 30  | 7.9848    | 1.4128  | 1.58913 | 61.13 |
| 31  | −5.4208   | 0.7274  | | |
| 32  | −4958.6277 | 2.3067 | 1.49700 | 81.61 |
| 33  | −5.4231   | 0.0481  | | |
| 34  | 10.5059   | 1.3032  | 1.80518 | 25.42 |
| 35  | −116.4855 | 2.0542  | | |
| 36  | ∞         | 7.3135  | 1.51633 | 64.14 |
| 37  | ∞         | | | |

First Optical Path Deflection Unit: Position of 6.2683 from Surface 10 to Reduction Side
Second Optical Path Deflection Unit: Position of 6.6320 from Surface 16 to Reduction Side

TABLE 14

| Example 5 Specification (d line) | |
|---|---|
| \|f'\| | 1.00 |
| Bf' | 6.87 |
| FNo. | 1.60 |
| 2ω [°] | 142.0 |

TABLE 15

Example 5 Aspheric Surface Coefficient

| | Surface Number | | | |
|---|---|---|---|---|
| | 1 | 2 | 15 | 16 |
| KA | −5.811087048852E−01 | −3.925385987134E+00 | −5.000009000000E+00 | 6.430246209432E−01 |
| A3 | 3.191125186166E−02 | 4.024177122305E−02 | −3.566197948709E−19 | −6.885924314129E−19 |
| A4 | 1.125759620224E−03 | −1.548636319752E−02 | 1.813498517951E−05 | 1.520015302533E−03 |
| A5 | −1.678396921949E−03 | 9.150014738207E−03 | −2.659770971814E−04 | 5.408477930993E−04 |
| A6 | 1.409083328857E−04 | −3.369952222948E−03 | 2.386292320121E−04 | −1.777119022806E−04 |
| A7 | 3.118823059634E−05 | 5.736740078980E−04 | −1.315817244105E−04 | −6.240858445333E−05 |
| A8 | −4.666627061959E−06 | −1.923575421673E−05 | 8.804138825395E−06 | 2.623389498716E−05 |
| A9 | −3.217562625405E−07 | −6.942120664994E−06 | 1.676065226995E−05 | 5.224281958850E−06 |
| A10 | 8.041281518182E−08 | 8.549967670911E−07 | −4.329089855685E−06 | −2.619613034492E−06 |
| A11 | 9.078041646221E−10 | −4.789052866331E−08 | −7.374875622152E−07 | −2.766182658687E−07 |
| A12 | −7.986671151024E−10 | 8.170228751305E−09 | 3.571776914614E−07 | 1.575633243026E−07 |
| A13 | 1.394217060761E−11 | −4.261487423365E−10 | 2.729298373551E−09 | 8.924474820683E−09 |
| A14 | 4.700358094158E−12 | −1.240309512106E−10 | −1.357506751515E−08 | −5.685074659310E−09 |
| A15 | −1.633144397615E−13 | 1.898642116837E−12 | 8.232204502892E−10 | −1.700228921193E−10 |
| A16 | −1.533405473470E−14 | 3.857534300795E−12 | 2.491156246315E−10 | 1.203882220147E−10 |
| A17 | 7.162971745001E−16 | −5.312901465011E−13 | −2.596862112650E−11 | 1.759921581500E−12 |
| A18 | 2.102713882978E−17 | 2.958600123134E−14 | −1.712108758373E−12 | −1.375443368287E−12 |
| A19 | −1.200833218130E−18 | −6.836185994050E−16 | 2.520018173232E−13 | −7.653523566702E−15 |
| A20 | 2.228855132844E−21 | 3.446412570987E−18 | −1.206620682433E−15 | 6.533303473367E−15 |

| | Surface Number | | | |
|---|---|---|---|---|
| | 19 | 20 | 21 | 22 |
| KA | 1.000000000000E+00 | 1.000000000000E+00 | 1.000000000000E+00 | 1.000000000000E+00 |
| A3 | −3.048652390586E−19 | 1.561540635477E−19 | −3.307182406314E−19 | 1.227002312338E−18 |
| A4 | −2.617378131683E−04 | −3.588483717683E−04 | 1.096216315400E−03 | 1.113670367786E−03 |
| A5 | 1.305287633842E−05 | 7.177408419302E−05 | 4.607244413330E−04 | 2.607284830089E−04 |
| A6 | 1.600795087192E−05 | −1.366088314009E−06 | −7.108029827630E−05 | −2.731089209950E−05 |
| A7 | 5.006566592075E−07 | 1.640560608175E−06 | −3.931319818521E−05 | −1.076472043903E−05 |
| A8 | −5.890401920288E−07 | −5.343308674164E−07 | 1.833481378248E−06 | 3.013082941068E−06 |
| A9 | −3.056073937358E−09 | −5.843309163951E−09 | 8.787951358025E−08 | 6.701337055140E−07 |
| A10 | 7.585178096323E−09 | 6.389080860975E−09 | −1.587371236639E−06 | −3.339023731308E−07 |
| A11 | 2.180868091676E−11 | 3.441038420061E−11 | 1.748514510976E−07 | −3.408080523958E−08 |
| A12 | −3.631262265800E−11 | −2.460275488069E−11 | 6.727786650114E−08 | 2.100970546092E−08 |
| A13 | 0.000000000000E+00 | 0.000000000000E+00 | −1.166936502162E−08 | 9.506233242513E−10 |
| A14 | 0.000000000000E+00 | 0.000000000000E+00 | −1.452816991795E−09 | −7.640389420509E−10 |
| A15 | 0.000000000000E+00 | 0.000000000000E+00 | 3.497746825253E−10 | −1.318101050281E−11 |
| A16 | 0.000000000000E+00 | 0.000000000000E+00 | 1.221918661455E−11 | 1.622541958293E−11 |
| A17 | 0.000000000000E+00 | 0.000000000000E+00 | −5.129646130585E−12 | 7.540764162200E−14 |
| A18 | 0.000000000000E+00 | 0.000000000000E+00 | 5.859905317352E−14 | −1.856812903736E−13 |
| A19 | 0.000000000000E+00 | 0.000000000000E+00 | 2.978000952490E−14 | −5.916550143857E−17 |
| A20 | 0.000000000000E+00 | 0.000000000000E+00 | −1.213686576975E−15 | 8.776679155271E−16 |

Figure 6:
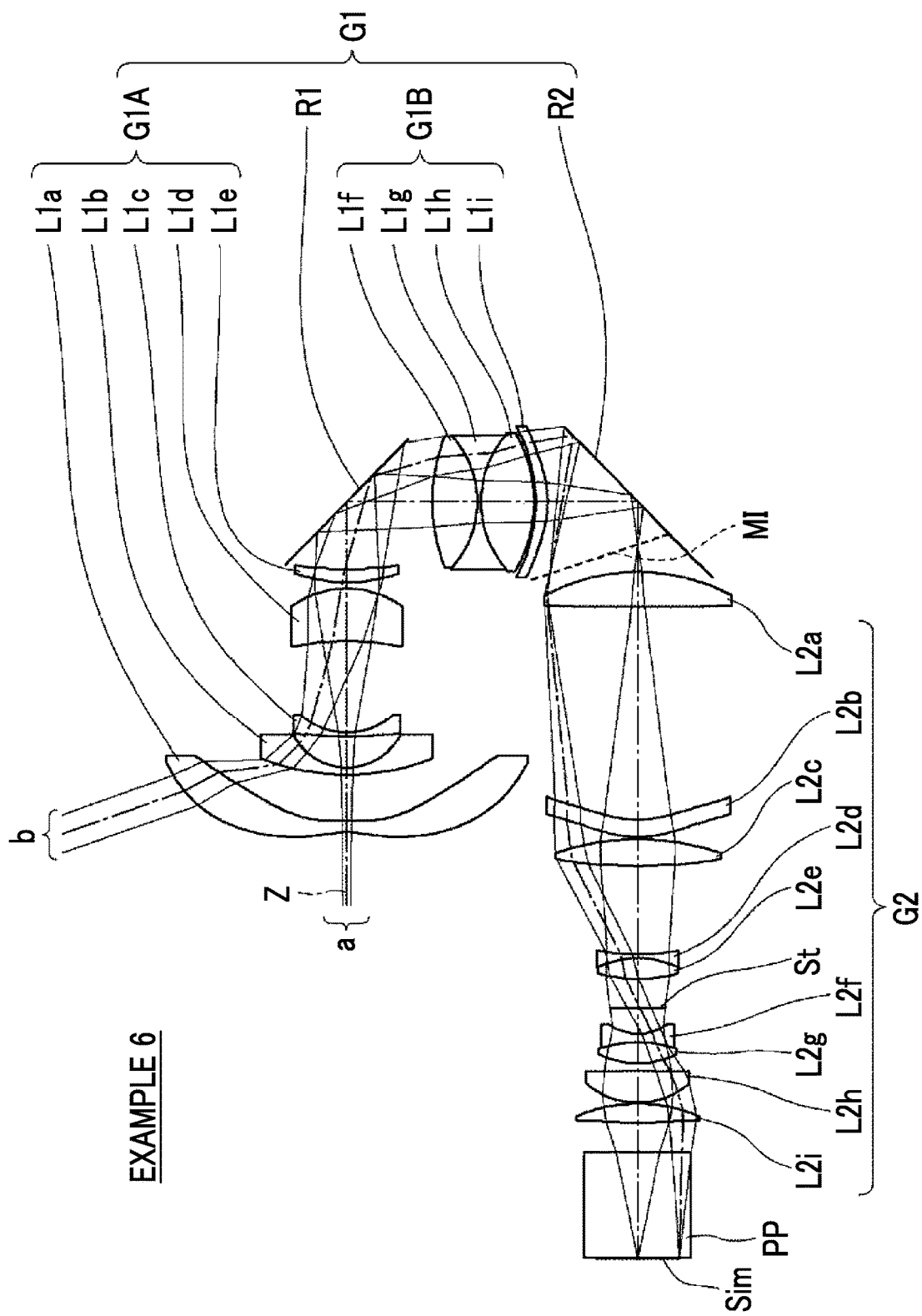
FIG. 6 is a cross-sectional view illustrating a lens configuration of an imaging optical system of Example 6 of the present invention.
Figure 13:
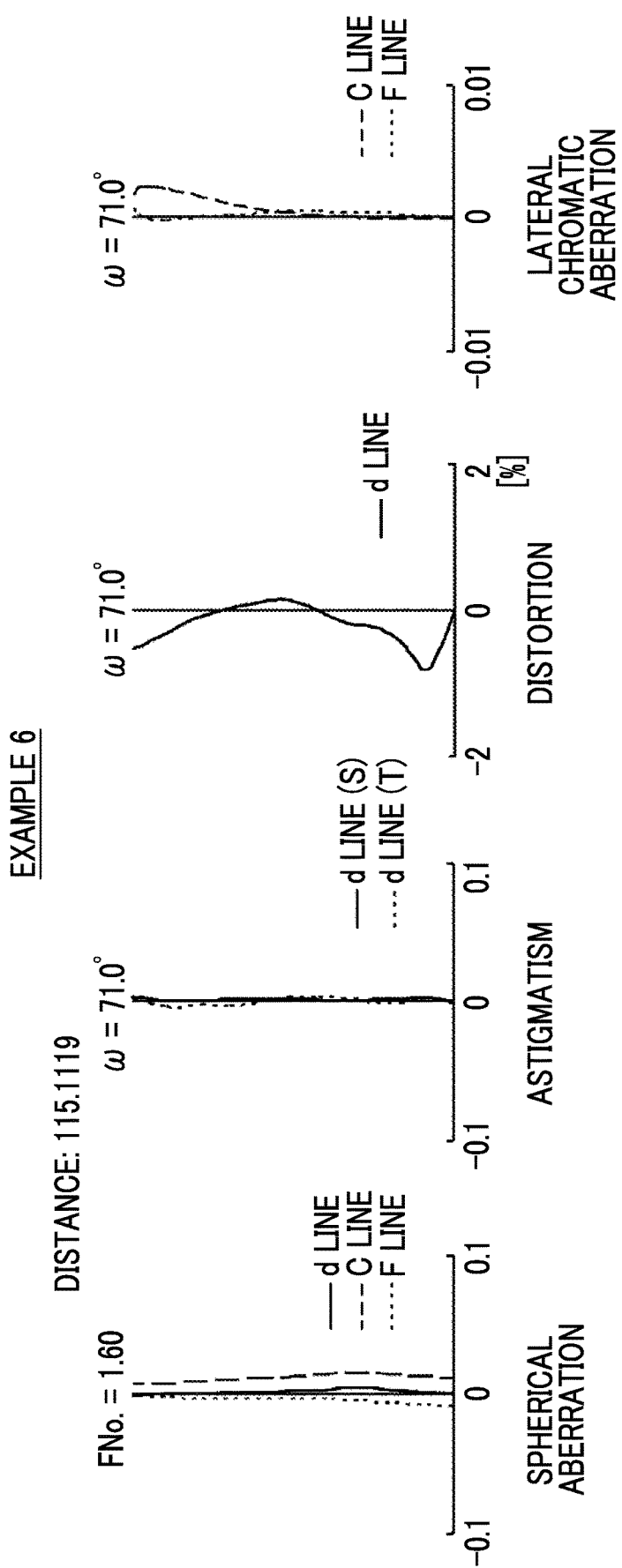
FIG. 13 is a diagram of aberrations of the imaging optical system of Example 6 of the present invention.

Next, an imaging optical system of Example 6 will be described. FIG. 6 is a cross-sectional view illustrating a lens configuration of the imaging optical system of Example 6. The group configuration of the imaging optical system of Example 6 is the same as that of the imaging optical system of Example 1 except the following points. The first A lens group G1A is composed of five lenses L1a to L1e, the first B lens group G1B is composed of four lenses L1f to L1i, and the second imaging optical system G2 is composed of nine lenses L2a to L2i and an aperture stop St. Further, Table 16 shows basic lens data of the imaging optical system of Example 6, Table 17 shows data about specification, and Table 18 shows data about aspheric surface coefficients. FIG. 13 shows aberration diagrams in a case where the distance from the magnification side imaging surface to the first imaging optical system is set to 115.1119.

TABLE 16

| Example 6 Lens Data (n, ν are based on the d line) | | | | |
|---|---|---|---|---|
| Surface Number | Radius of Curvature | Surface Distance | n | ν |
| *1 | −4.0711 | 0.7966 | 1.53158 | 55.08 |
| *2 | −9.0865 | 3.1509 | | |

TABLE 16-continued

| Example 6 Lens Data (n, ν are based on the d line) | | | | |
|---|---|---|---|---|
| Surface Number | Radius of Curvature | Surface Distance | n | ν |
| 3 | 17.3380 | 0.4827 | 1.89190 | 37.13 |
| 4 | 4.2693 | 2.1300 | | |
| 5 | 30.2566 | 0.2652 | 1.83481 | 42.72 |
| 6 | 4.7058 | 6.3795 | | |
| 7 | −19.0801 | 3.6197 | 1.48749 | 70.24 |

TABLE 16-continued

Example 6 Lens Data (n, ν are based on the d line)

| Surface Number | Radius of Curvature | Surface Distance | n | ν |
|---|---|---|---|---|
| 8 | −6.6984 | 0.4293 | | |
| 9 | 11.4965 | 0.9032 | 1.84666 | 23.78 |
| 10 | 27.4803 | 10.6548 | | |
| 11 | 12.2289 | 3.1529 | 1.65160 | 58.55 |
| 12 | −6.5651 | 0.2414 | 1.80518 | 25.42 |
| 13 | 6.8368 | 3.7202 | 1.49700 | 81.61 |
| 14 | −9.2794 | 0.1207 | | |
| *15 | −8.8554 | 0.8497 | 1.51007 | 56.24 |
| *16 | −6.1696 | 11.1541 | | |
| 17 | 14.2294 | 2.4131 | 1.48749 | 70.24 |
| 18 | −188.9256 | 14.6880 | | |
| *19 | −7.2767 | 1.2076 | 1.51007 | 56.24 |
| *20 | −7.2582 | 0.1207 | | |
| 21 | 17.7964 | 1.8657 | 1.83481 | 42.72 |
| 22 | −34.0082 | 6.1143 | | |
| 23 | −13.4046 | 0.2414 | 1.84666 | 23.78 |
| 24 | 6.7432 | 1.4290 | 1.83481 | 42.72 |
| 25 | −9.9745 | 1.9103 | | |
| 26 (Stop) | ∞ | 1.7733 | | |
| 27 | −3.7437 | 0.6035 | 1.80610 | 33.27 |
| 28 | 8.7032 | 1.4520 | 1.60311 | 60.64 |
| 29 | −6.2654 | 0.4713 | | |
| 30 | 130.0358 | 2.2229 | 1.49700 | 81.61 |
| 31 | −5.6738 | 0.0480 | | |
| 32 | 10.8544 | 1.2997 | 1.80809 | 22.76 |
| 33 | −72.0101 | 2.0735 | | |
| 34 | ∞ | 7.3131 | 1.51633 | 64.14 |
| 35 | ∞ | | | |

First Optical Path Deflection Unit: Position of 4.6217 from Surface 10 to Reduction Side Second Optical Path Deflection Unit: Position of 6.3276 from Surface 16 to Reduction Side

TABLE 17

| Example 6 Specification (d line) | |
|---|---|
| \|f'\| | 1.00 |
| Bf | 6.89 |
| FNo. | 1.60 |
| 2ω [°] | 142.0 |

TABLE 18

Example 6 Aspheric Surface Coefficient

| | Surface Number | | |
|---|---|---|---|
| | 1 | 2 | 15 |
| KA | −4.514835761937E−01 | −5.000007582549E+00 | −4.999999999869E+00 |
| A3 | 3.245002218986E−02 | 4.076835246343E−02 | 3.193643961544E−19 |
| A4 | 1.701606852742E−03 | −1.483236560986E−02 | 7.306280244007E−04 |
| A5 | −1.868501519066E−03 | 8.729060267861E−03 | −3.422986123529E−04 |
| A6 | 1.414864001395E−04 | −3.296633767867E−03 | 1.588595621250E−04 |
| A7 | 3.765044458591E−05 | 5.627953260477E−04 | −4.443241731010E−05 |
| A8 | −5.168015467108E−06 | −1.700453025691E−05 | −6.809572480714E−06 |
| A9 | −4.286385373242E−07 | −7.037145856875E−06 | 4.716383222495E−06 |
| A10 | 9.461714565045E−08 | 7.905616964111E−07 | −5.268336548746E−07 |
| A11 | 1.715295060851E−09 | −3.544998950860E−08 | −7.310667651511E−09 |
| A12 | −9.844111532316E−10 | 7.559909247549E−09 | 1.716239397066E−08 |
| A13 | 1.308955347619E−11 | −5.123692368216E−10 | −1.707725421626E−08 |
| A14 | 6.019372582205E−12 | −1.106897333201E−10 | 2.704987841264E−09 |
| A15 | −1.924257436655E−13 | 2.595976369810E−12 | 9.076011648368E−10 |
| A16 | −2.026827961347E−14 | 3.472559809527E−12 | −1.949901557596E−10 |
| A17 | 9.097368646085E−16 | −4.842954854498E−13 | −1.948898734175E−11 |
| A18 | 2.842947432412E−17 | 2.681840429396E−14 | 4.873203180474E−12 |
| A19 | −1.601282503435E−18 | −6.060685148322E−16 | 1.565619644711E−13 |
| A20 | 3.674152717103E−21 | 2.703875655538E−18 | −4.323933236484E−14 |

| | Surface Number | | |
|---|---|---|---|
| | 16 | 19 | 20 |
| KA | 6.211970173712E−01 | 1.000000000000E+00 | 1.000000000000E+00 |
| A3 | −3.364174382462E−19 | 0.000000000000E+00 | 5.372236474091E−20 |
| A4 | 1.853205905517E−03 | 1.152946366128E−03 | 1.171692505182E−03 |
| A5 | 7.360737875239E−04 | 4.285619315490E−04 | 5.957359881421E−05 |
| A6 | −2.326491044344E−04 | −1.905689321208E−04 | −3.522960799401E−05 |
| A7 | −6.775653071763E−05 | 2.794837316092E−06 | 1.245777471451E−05 |
| A8 | 2.903214177634E−05 | 2.626508622721E−05 | 9.280211750116E−07 |
| A9 | 4.729640229440E−06 | −5.848457596688E−06 | −1.144559627859E−06 |
| A10 | −2.714837553982E−06 | −1.452990622200E−06 | 2.998065856581E−08 |
| A11 | −2.263178015640E−07 | 5.838124075090E−07 | 4.936915906057E−08 |
| A12 | 1.600190165918E−07 | 2.550851923408E−08 | −2.062292582629E−09 |
| A13 | 6.876394380827E−09 | −2.772237721186E−08 | −1.313917722888E−09 |
| A14 | −5.715498438912E−09 | 9.032313028379E−10 | 4.038529796527E−11 |
| A15 | −1.256886734017E−10 | 7.156136462484E−10 | 2.271841080386E−11 |
| A16 | 1.198295478958E−10 | −5.266135357225E−11 | −1.791535974996E−13 |
| A17 | 1.259543092660E−12 | −9.658324080338E−12 | −2.344093726699E−13 |
| A18 | −1.352495214830E−12 | 9.636133386619E−13 | −3.921186772473E−15 |

TABLE 18-continued

| Example 6 Aspheric Surface Coefficient | | |
|---|---|---|
| A19 | −5.330644359257E−15 | 5.342652179368E−14 | 1.078893922347E−15 |
| A20 | 6.331299722307E−15 | −6.333895506077E−15 | 4.095402679159E−17 |

Figure 7:
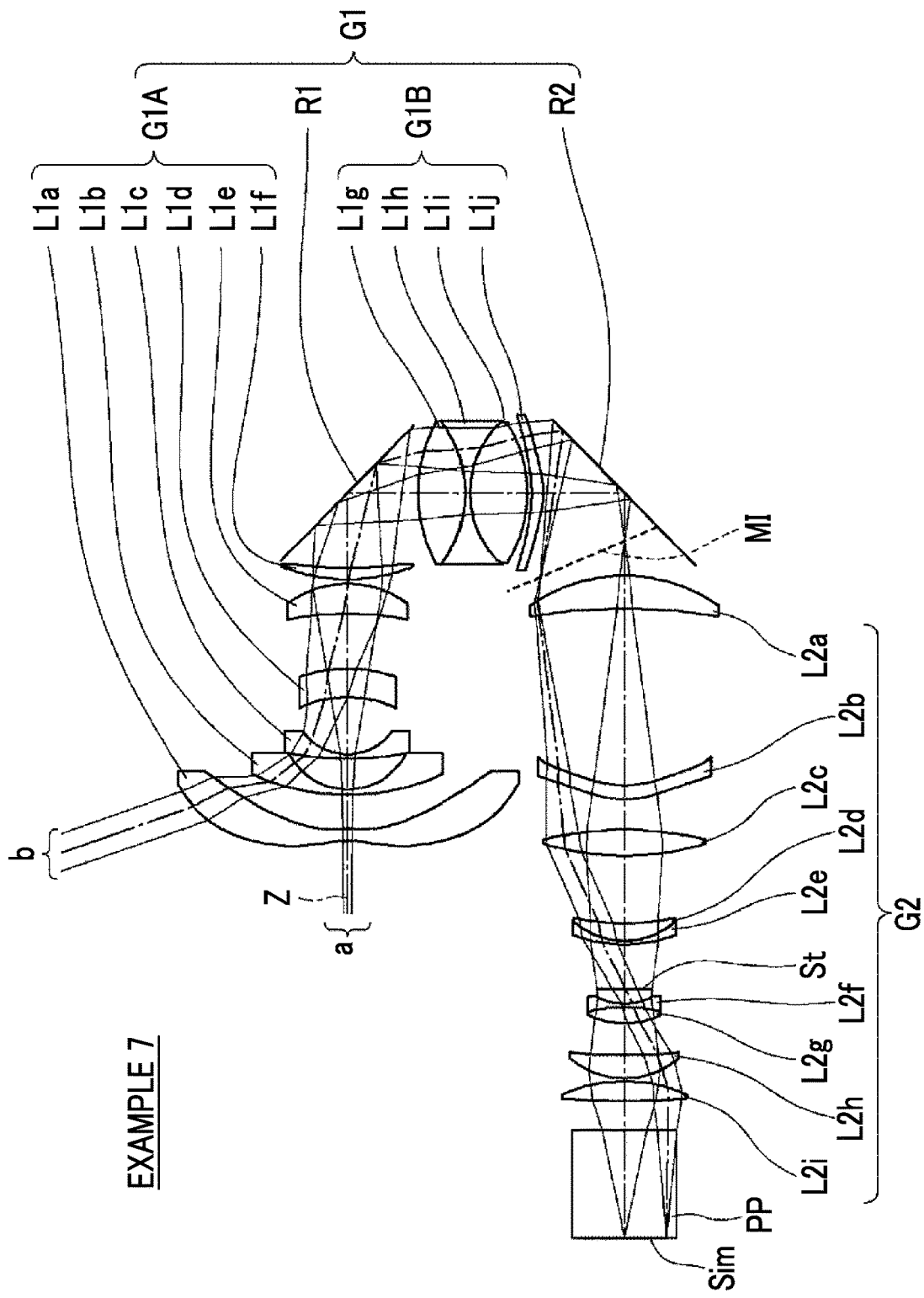
FIG. 7 is a cross-sectional view illustrating a lens configuration of an imaging optical system of Example 7 of the present invention.
Figure 14:
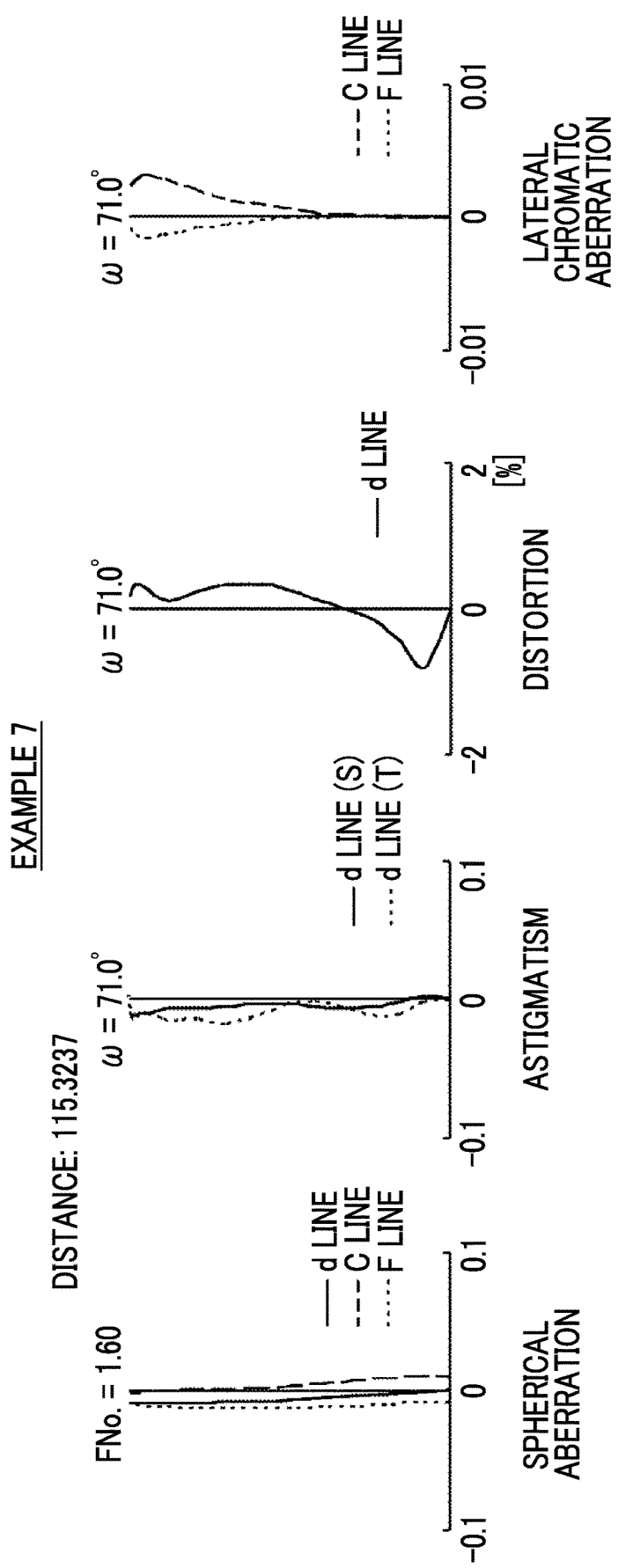
FIG. 14 is a diagram of aberrations of the imaging optical system of Example 7 of the present invention.

Next, an imaging optical system of Example 7 will be described. FIG. 7 is a cross-sectional view illustrating a lens configuration of the imaging optical system of Example 7. The group configuration of the imaging optical system of Example 7 is the same as that of the imaging optical system of Example 1 except the following points. The first A lens group G1A is composed of six lenses L1a to L1f, the first B lens group G1B is composed of four lenses L1g to L1j, and the second imaging optical system G2 is composed of nine lenses L2a to L2i and an aperture stop St. Further, Table 19 shows basic lens data of the imaging optical system of Example 7, Table 20 shows data about specification, and Table 21 shows data about aspheric surface coefficients. FIG. 14 shows aberration diagrams in a case where the distance from the magnification side imaging surface to the first imaging optical system is set to 115.3237.

TABLE 19

| Example 7 Lens Data (n, ν are based on the d line) | | | | |
|---|---|---|---|---|
| Surface Number | Radius of Curvature | Surface Distance | n | ν |
| *1 | −4.0773 | 0.7981 | 1.53158 | 55.08 |
| *2 | −9.6739 | 2.3182 | | |
| 3 | 15.9055 | 0.3888 | 1.63854 | 55.38 |
| 4 | 4.5925 | 2.1510 | | |
| 5 | 26.1283 | 0.2658 | 1.90366 | 31.31 |
| 6 | 3.8662 | 3.9062 | | |
| 7 | −8.0387 | 1.9341 | 1.48749 | 70.44 |
| 8 | −10.5748 | 3.7654 | | |
| 9 | −21.2471 | 2.0489 | 1.48749 | 70.44 |
| 10 | −7.0806 | 0.3159 | | |
| 11 | 12.9549 | 0.7933 | 1.84666 | 23.78 |
| 12 | 38.2220 | 10.0745 | | |
| 13 | 10.1725 | 3.2179 | 1.58913 | 61.13 |
| 14 | −8.2269 | 0.3261 | 1.84666 | 23.78 |
| 15 | 6.5416 | 3.9865 | 1.49700 | 81.61 |
| 16 | −8.8423 | 0.3121 | | |
| *17 | −8.2667 | 0.7934 | 1.51007 | 56.24 |
| *18 | −5.8088 | 11.3516 | | |
| 19 | 11.5902 | 2.2403 | 1.62041 | 60.29 |
| 20 | 38.0048 | 12.0946 | | |
| *21 | −6.4334 | 0.9709 | 1.51007 | 56.24 |
| *22 | −6.4757 | 2.0967 | | |
| 23 | 24.9189 | 1.7645 | 1.77250 | 49.60 |
| 24 | −20.0478 | 4.5870 | | |
| 25 | −19.3698 | 1.2196 | 1.77250 | 49.60 |
| 26 | −5.5334 | 0.2450 | 1.80518 | 25.46 |
| 27 | −10.4207 | 2.9737 | | |
| 28 (Stop) | ∞ | 1.0346 | | |
| 29 | −3.9627 | 0.2176 | 1.80518 | 25.46 |
| 30 | 10.2350 | 0.0076 | | |
| 31 | 10.5711 | 1.1026 | 1.58913 | 61.13 |
| 32 | −6.0135 | 2.2339 | | |
| 33 | −32.2935 | 1.5584 | 1.56883 | 56.36 |
| 34 | −5.9499 | 0.2013 | | |
| 35 | 10.8296 | 1.3298 | 1.80518 | 25.46 |
| 36 | −61.7627 | 2.0410 | | |
| 37 | ∞ | 7.3266 | 1.51633 | 64.14 |
| 38 | ∞ | | | |

First Optical Path Deflection Unit: Position of 5.1182 from Surface 12 to Reduction Side Second Optical Path Deflection Unit: Position of 5.6701 from Surface 18 to Reduction Side

TABLE 20

| Example 7 Specification (d line) | |
|---|---|
| |f| | 1.00 |
| Bf | 6.86 |
| FNo. | 1.60 |
| 2ω [°] | 142.0 |

TABLE 21

| Example 7 Aspheric Surface Coefficient | | | |
|---|---|---|---|
| | Surface Number | | |
| | 1 | 2 | 17 |
| KA | −6.073896072848E−01 | −4.992156680535E+00 | −4.775661093660E+00 |
| A3 | 3.486953703977E−02 | 4.433790715466E−02 | 0.000000000000E+00 |
| A4 | 6.808603982643E−04 | −1.772178157558E−02 | 1.439657968921E−03 |
| A5 | −2.022622983602E−03 | 1.033655881260E−02 | −1.017701659569E−03 |
| A6 | 2.154647619611E−04 | −4.029145686598E−03 | 1.218424396475E−03 |
| A7 | 3.901293201291E−05 | 7.336714038734E−04 | −3.940537677429E−04 |
| A8 | −7.573002709352E−06 | −2.547458880403E−05 | −1.328346691107E−04 |
| A9 | −3.559369484138E−07 | −1.037063915040E−05 | 1.125437274764E−04 |
| A10 | 1.391265451958E−07 | 1.256985879782E−06 | −1.315052343260E−05 |
| A11 | −8.805042772146E−10 | −3.782053605947E−08 | −9.601704261436E−06 |
| A12 | −1.465199470892E−09 | 9.439022332463E−09 | 3.198520155548E−06 |
| A13 | 5.045958511921E−11 | −1.146950102376E−09 | 1.449727701628E−07 |
| A14 | 9.025857872471E−12 | −1.486437767948E−10 | −2.097297836969E−07 |
| A15 | −4.782125743885E−13 | 7.532654748218E−12 | 2.055217545471E−08 |
| A16 | −2.996938303140E−14 | 6.146791196128E−12 | 5.172779251881E−09 |
| A17 | 2.065569251035E−15 | −9.687661854875E−13 | −1.063049151607E−09 |
| A18 | 3.700471974837E−17 | 5.724567410081E−14 | −9.920550729399E−12 |

TABLE 21-continued

Example 7 Aspheric Surface Coefficient

| | | | |
|---|---|---|---|
| A19 | −3.562648803240E−18 | −1.271339784180E−15 | 1.514112115660E−11 |
| A20 | 2.351118693869E−20 | 1.675016340403E−18 | −9.504199262138E−13 |

| | Surface Number | | |
|---|---|---|---|
| | 18 | 21 | 22 |
| KA | −5.618157966094E−01 | 9.999831293160E−01 | 9.918847671292E−01 |
| A3 | 0.000000000000E+00 | 0.000000000000E+00 | 0.000000000000E+00 |
| A4 | 8.737102689118E−04 | 2.226717915347E−03 | 1.826805469954E−03 |
| A5 | 2.359173894315E−03 | −1.715992864799E−04 | 3.556535045874E−06 |
| A6 | −8.303909153596E−04 | −1.890332587963E−04 | −2.337012212416E−04 |
| A7 | −1.133999075062E−04 | 1.878124255662E−04 | 1.360796979729E−04 |
| A8 | 1.550142406255E−04 | −6.355772220541E−06 | 2.095877853821E−05 |
| A9 | −2.817055617452E−05 | −3.048077411383E−05 | −2.675645188104E−05 |
| A10 | −1.077808243721E−05 | 4.164997761991E−06 | 5.676698615223E−07 |
| A11 | 4.162471013095E−06 | 2.411821692885E−06 | 2.433322085449E−06 |
| A12 | 2.169227132115E−07 | −4.379715966438E−07 | −2.142302542595E−07 |
| A13 | −2.434485903166E−07 | −1.092722985495E−07 | −1.214359463371E−07 |
| A14 | 1.007937762820E−08 | 2.281576980658E−08 | 1.505653700331E−08 |
| A15 | 7.314617059425E−09 | 2.887969179565E−09 | 3.411252993529E−09 |
| A16 | −6.402137577706E−10 | −6.587223533353E−10 | −5.003703545799E−10 |
| A17 | −1.115538830580E−10 | −4.141801044381E−11 | −5.057147021036E−11 |
| A18 | 1.292950625896E−11 | 1.008635500691E−11 | 8.228550088256E−12 |
| A19 | 6.842833809097E−13 | 2.489700445376E−13 | 3.079399346652E−13 |
| A20 | −9.298780666590E−14 | −6.401102071269E−14 | −5.389326677802E−14 |

Table 22 shows values corresponding to Conditional Expressions (1) to (8) of the imaging optical systems of Examples 1 to 7. It should be noted that, in the above-mentioned examples, the d line is set as the reference wavelength, and the values shown in Table 22 are values at the reference wavelength.

TABLE 22

| Expression Number | Conditional Expression | Example 1 | Example 2 | Example 3 | Example 4 |
|---|---|---|---|---|---|
| (1) | Bf1/\|f\| | 8.57 | 9.12 | 9.32 | 9.24 |
| (2) | \|f\|/f2 | −0.01 | −0.01 | −0.01 | −0.02 |
| (3) | f1/\|f\| | 2.00 | 2.03 | 2.04 | 2.14 |
| (4) | Σt1B/TL1B | 0.97 | 0.97 | 0.99 | 0.98 |
| (5) | fL2a/\|f\| | 22.25 | 21.75 | 22.26 | 21.57 |
| (6) | fLBL/\|f\| | 24.97 | 26.39 | 25.41 | 35.75 |
| (7) | La/Lc | 1.66 | 1.77 | 1.77 | 1.81 |
| (8) | Lb/Lc | 0.73 | 0.80 | 0.80 | 0.89 |

| Expression Number | Conditional Expression | Example 5 | Example 6 | Example 7 |
|---|---|---|---|---|
| (1) | Bf1/\|f\| | 9.82 | 9.50 | 9.12 |
| (2) | \|f\|/f2 | −0.02 | −0.03 | −0.02 |
| (3) | f1/\|f\| | 2.19 | 2.21 | 2.13 |
| (4) | Σt1B/TL1B | 0.99 | 0.99 | 0.96 |
| (5) | fL2a/\|f\| | 24.45 | 27.25 | 26.03 |
| (6) | fLBL/\|f\| | 35.66 | 36.03 | 34.54 |
| (7) | La/Lc | 1.81 | 1.87 | 1.75 |
| (8) | Lb/Lc | 0.81 | 0.90 | 0.81 |

As can be seen from the above data, since all the imaging optical systems of Examples 1 to 7 satisfy Conditional Expressions (1) to (8), each imaging optical system has a high optical performance, in which various aberrations are satisfactorily corrected with a wide angle, by achieving reduction in size while minimizing the size in the height direction. The wide angle means that the total angle of view is equal to or greater than 130°.

Figure 15:
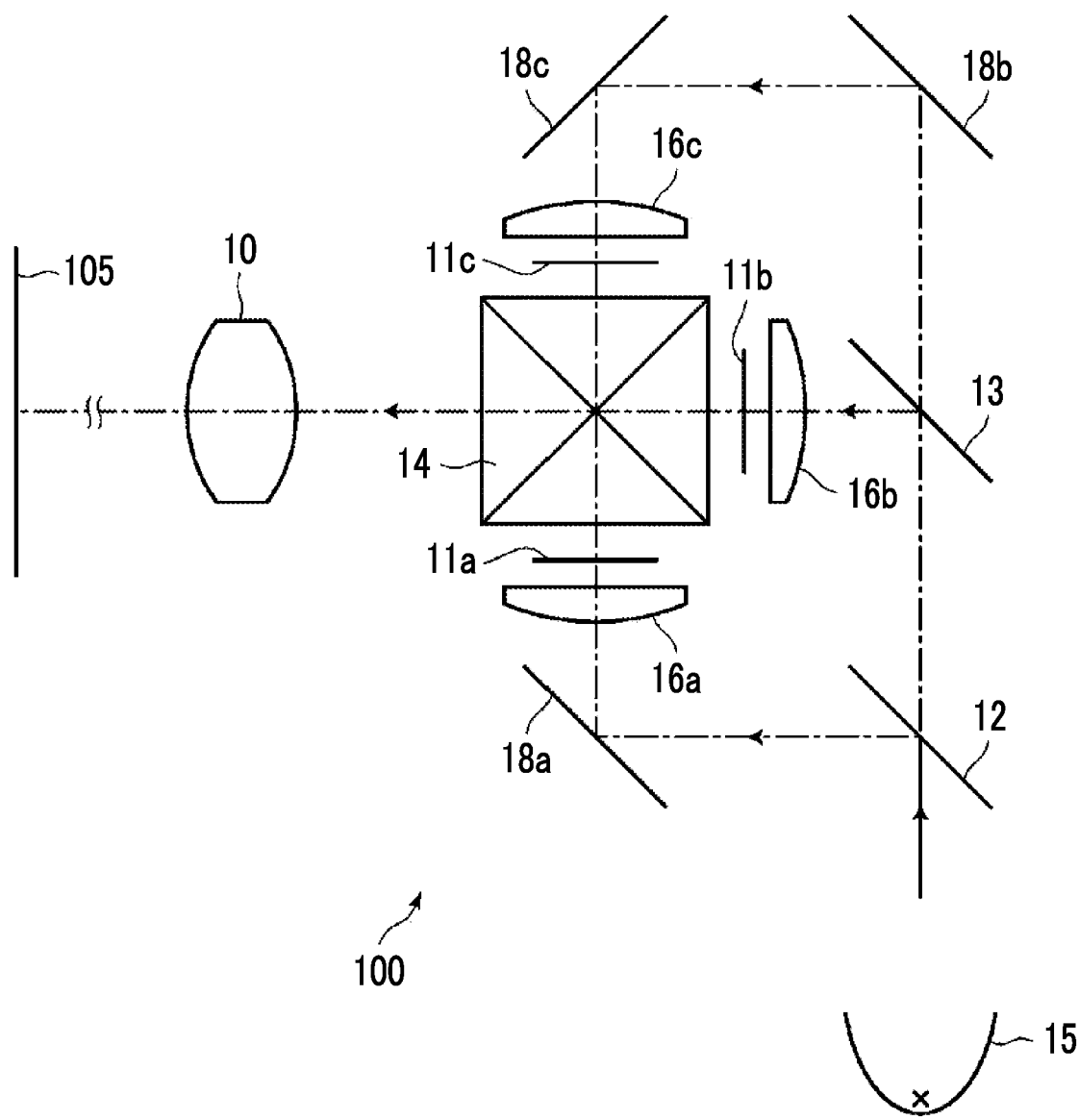
FIG. 15 is a schematic configuration diagram of a projection display device according to an embodiment of the present invention.

Next, a projection display device according to an embodiment of the present invention will be described. FIG. 15 is a schematic configuration diagram of the projection display device according to the above-mentioned embodiment of the present invention. The projection display device 100 shown in FIG. 15 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 15, the imaging optical system 10 is schematically illustrated. Further, an integrator is disposed between the light source 15 and the dichroic mirror 12, but illustration thereof is omitted in FIG. 15.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light modulated through the transmissive display elements 11a to 11c, onto a screen 105.

Figure 16:
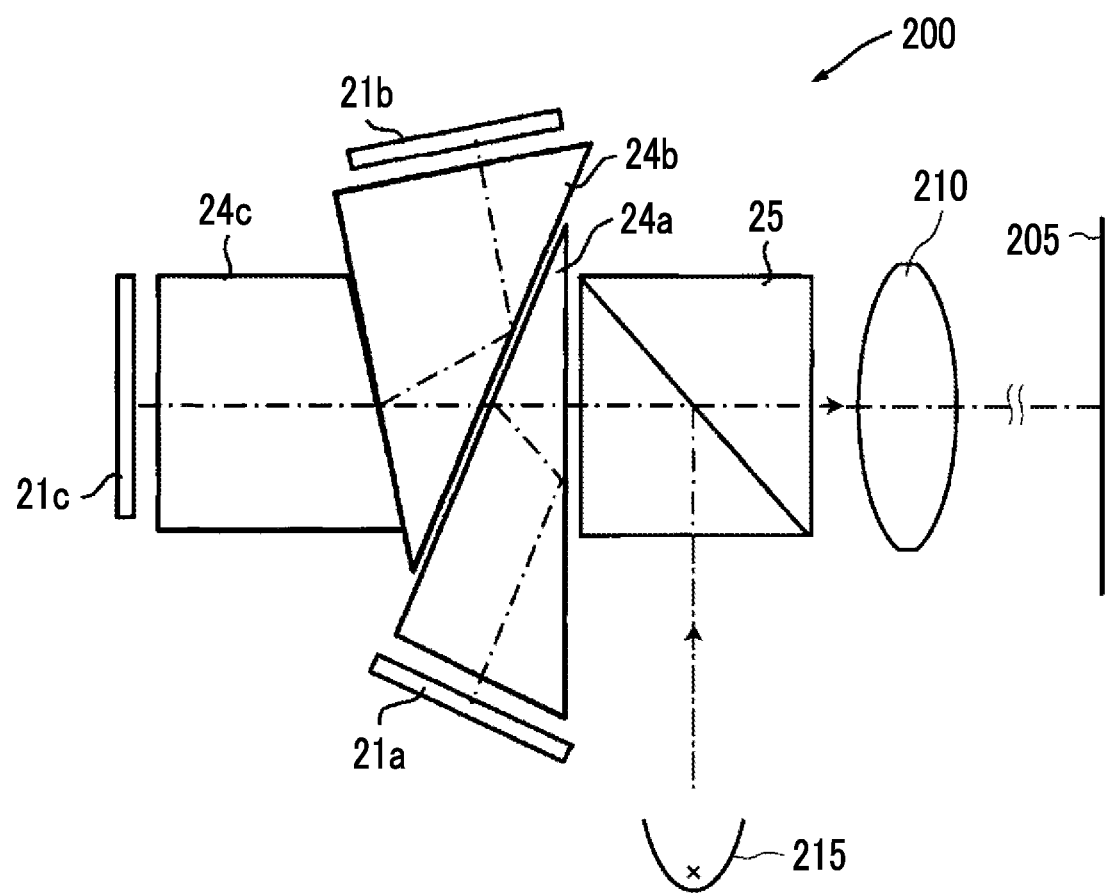
FIG. 16 is a schematic configuration diagram of a projection display device according to another embodiment of the present invention.

FIG. 16 is a schematic configuration diagram of a projection display device according to another embodiment of the present invention. The projection display device 200 shown in FIG. 16 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 16, the imaging optical system 210 is schematically illustrated. Further, an integrator is disposed between the light source 215 and the polarization separating prism 25, but illustration thereof is omitted in FIG. 16.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light modulated through the DMD elements 21a to 21c, onto a screen 205.

Figure 17:
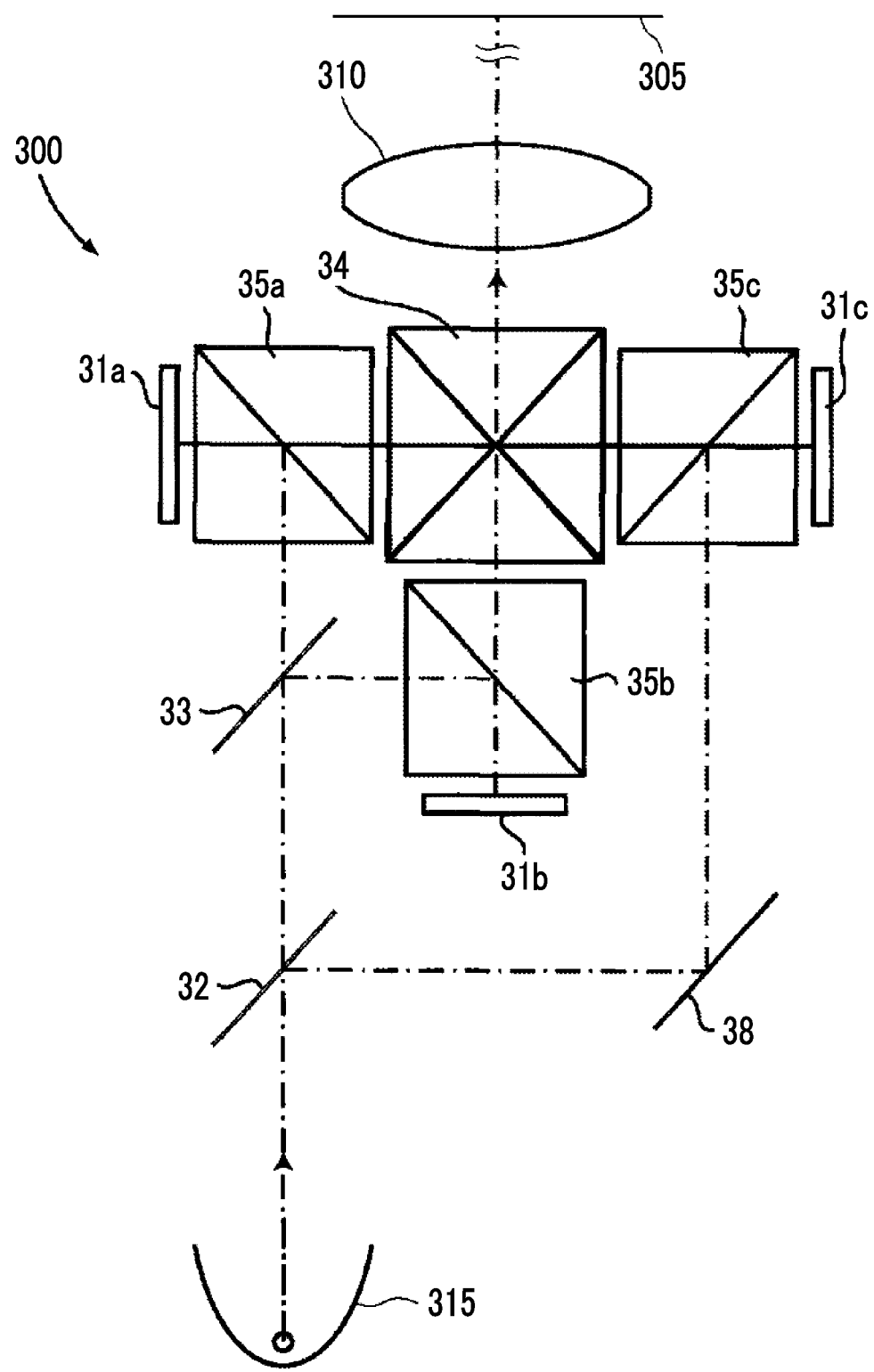
FIG. 17 is a schematic configuration diagram of a projection display device according to still another embodiment of the present invention.

FIG. 17 is a schematic configuration diagram of a projection display device according to still another embodiment of the present invention. The projection display device 300 shown in FIG. 17 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 17, the imaging optical system 310 is schematically illustrated. Further, an integrator is disposed between the light source 315 and the dichroic mirror 32, but illustration thereof is omitted in FIG. 17.

White light originated from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light modulated through the reflective display elements 31a to 31c, onto a screen 305.

Figure 18:
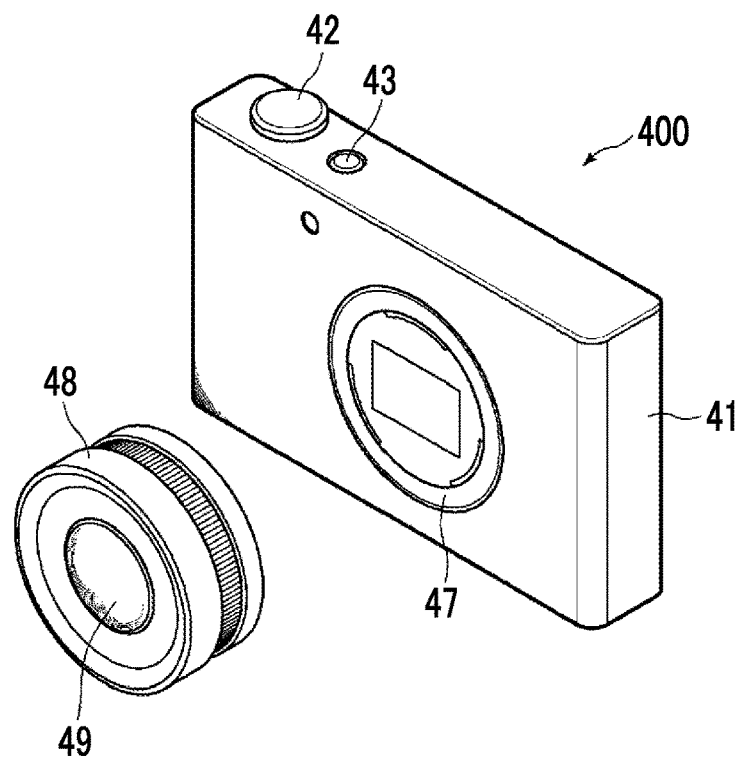
FIG. 18 is a perspective view of the front side of an imaging apparatus according to an embodiment of the present invention.
Figure 19:
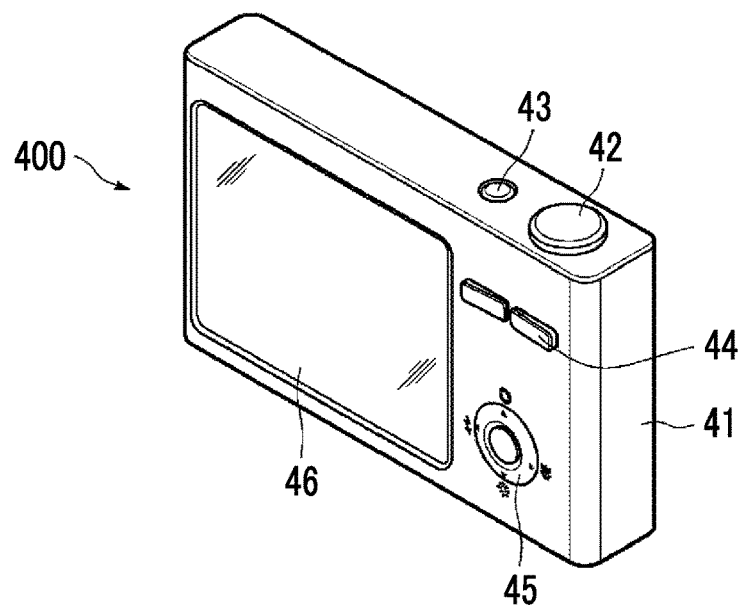
FIG. 19 is a perspective view of the rear side of the imaging apparatus shown in FIG. 18.

FIGS. 18 and 19 are external views of a camera 400 which is the imaging apparatus according to the above-mentioned embodiment of the present invention. FIG. 18 is a perspective view of the camera 400 viewed from the front side, and FIG. 19 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface distance, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
G1: first imaging optical system
G1A: first A lens group G1B: first B lens group
G2: second imaging optical system
L1a to L2j: lens
MI: intermediate image
PP: optical member
R1: first optical path deflection unit
R2: second optical path deflection unit
Sim: image display surface
a: on-axis rays
b: rays with maximum angle of view
Z: optical axis

What is claimed is:

1. An imaging optical system consisting of, in order from a magnification side:
a first imaging optical system that forms an intermediate image on a position conjugate to a magnification side imaging surface; and
a second imaging optical system that re-forms the intermediate image on a reduction side imaging surface,
wherein the first imaging optical system consists of, in order from the magnification side, a first A lens group, a first optical path deflection unit that deflects an optical path, a first B lens group, and a second optical path deflection unit that deflects the optical path,
wherein the intermediate image is formed between the second optical path deflection unit and the second imaging optical system, and
a total angle of view is equal to or greater than 130°.

2. The imaging optical system according to claim 1, wherein assuming that
a back focal length of the first imaging optical system is Bf1, and
a focal length of the whole system is f,
Conditional Expression (1) is satisfied $$5 < Bf1/|f| < 15 \tag{1}.$$

3. The imaging optical system according to claim 2, wherein Conditional Expression (1-1) is satisfied $$7 < Bf1/|f| < 12 \tag{1-1}.$$

4. The imaging optical system according to claim 1, wherein assuming that
a focal length of the whole system is f, and
a focal length of the second imaging optical system is f2,
Conditional Expression (2) is satisfied $$-0.1 < |f|/f2 \leq 0 \tag{2}.$$

5. The imaging optical system according to claim 4, wherein Conditional Expression (2-1) is satisfied $$-0.06 < |f|/f2 < 0 \tag{2-1}.$$

6. The imaging optical system according to claim 1, wherein assuming that
a focal length of the first imaging optical system is f1, and
a focal length of the whole system is f,
Conditional Expression (3) is satisfied $$1.5 < f1/|f| < 2.5 \tag{3}.$$

7. The imaging optical system according to claim 6, wherein Conditional Expression (3-1) is satisfied $$1.8 < f1/|f| < 2.3 \tag{3-1}.$$

8. The imaging optical system according to claim 1, wherein assuming that
a sum of center thicknesses of respective lenses composing the first B lens group is $\Sigma t1B$, and
a distance on the optical axis from a surface closest to the magnification side to a surface closest to a reduction side in the first B lens group is TL1B,
Conditional Expression (4) is satisfied $$0.8 < \Sigma t1B/TL1B < 1 \tag{4}.$$

9. The imaging optical system according to claim 8, wherein Conditional Expression (4-1) is satisfied $$0.9 < \Sigma t1B/TL1B < 1 \tag{4-1}.$$

10. The imaging optical system according to claim 1, wherein assuming that
a focal length of a lens closest to the magnification side in the second imaging optical system is fL2a, and
a focal length of the whole system is f,
Conditional Expression (5) is satisfied $$10 < fL2a/|f| < 50 \tag{5}.$$

11. The imaging optical system according to claim 10, wherein Conditional Expression (5-1) is satisfied $$15 < fL2a/|f| < 35 \tag{5-1}.$$

12. The imaging optical system according to claim 1, wherein assuming that
a focal length of a lens closest to the reduction side in the first B lens group is fLBL, and
a focal length of the whole system is f,
Conditional Expression (6) is satisfied $$10 < fLBL/|f| < 60 \tag{6}.$$

13. The imaging optical system according to claim 12, wherein Conditional Expression (6-1) is satisfied $$20 < fLBL/|f| < 45 \tag{6-1}.$$

14. The imaging optical system according to claim 1, wherein assuming that
a distance on the optical axis from a surface closest to the reduction side in the second imaging optical system to the second optical path deflection unit is La,
a distance on the optical axis from the second optical path deflection unit to the first optical path deflection unit is Lb, and
a distance on the optical axis from the first optical path deflection unit to a surface closest to the magnification side in the first A lens group is Lc,
Conditional Expressions (7) and (8) are satisfied $$1 < La/Lc < 3 \tag{7}$$

$$0.2 < Lb/Lc < 2 \tag{8}.$$

15. The imaging optical system according to claim 14, wherein Conditional Expression (7-1) is satisfied $$1.4 < La/Lc < 2.5 \tag{7-1}.$$

16. The imaging optical system according to claim 14, wherein Conditional Expression (8-1) is satisfied $$0.4 < Lb/Lc < 1.15 \tag{8-1}.$$

17. A projection display device, comprising:
a light valve from which an optical image is output based on image data; and
the imaging optical system according to claim 1,
wherein the imaging optical system projects the optical image, which is output from the light valve, onto a screen.

18. An imaging apparatus comprising the imaging optical system according to claim 1.

19. An imaging optical system consisting of, in order from a magnification side:
- a first imaging optical system that forms an intermediate image on a position conjugate to a magnification side imaging surface; and
- a second imaging optical system that re-forms the intermediate image on a reduction side imaging surface,
- wherein the first imaging optical system consists of, in order from the magnification side, a first A lens group, a first optical path deflection unit that deflects an optical path, a first B lens group, and a second optical path deflection unit that deflects the optical path,
- wherein the intermediate image is formed between the second optical path deflection unit and the second imaging optical system, and
- wherein assuming that
  - a focal length of the whole system is f, and
  - a focal length of the second imaging optical system is f2,
  - Conditional Expression (2) is satisfied $$-0.1 < |f1/f2| \leq 0 \quad (2).$$

20. An imaging optical system consisting of, in order from a magnification side:
- a first imaging optical system that forms an intermediate image on a position conjugate to a magnification side imaging surface; and
- a second imaging optical system that re-forms the intermediate image on a reduction side imaging surface,
- wherein the first imaging optical system consists of, in order from the magnification side, a first A lens group, a first optical path deflection unit that deflects an optical path, a first B lens group, and a second optical path deflection unit that deflects the optical path,
- wherein the intermediate image is formed between the second optical path deflection unit and the second imaging optical system, and
- wherein assuming that
  - a focal length of the first imaging optical system is f1, and
  - a focal length of the whole system is f,
  - Conditional Expression (3) is satisfied $$1.5 < f1/|f| < 2.5 \quad (3).$$

* * * * *